(12) United States Patent
Sugiura

(10) Patent No.: US 10,565,721 B2
(45) Date of Patent: Feb. 18, 2020

(54) INFORMATION PROCESSING DEVICE AND INFORMATION PROCESSING METHOD FOR SPECIFYING TARGET POINT OF AN OBJECT

(71) Applicant: Kabushiki Kaisha Toshiba, Minato-ku (JP)

(72) Inventor: Takayuki Sugiura, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/442,896

(22) Filed: Feb. 27, 2017

(65) Prior Publication Data

US 2017/0345180 A1 Nov. 30, 2017

(30) Foreign Application Priority Data

May 30, 2016 (JP) .................................. 2016-107455

(51) Int. Cl.
| | |
|---|---|
| G01S 7/48 | (2006.01) |
| G06K 9/62 | (2006.01) |
| G06T 7/70 | (2017.01) |
| G06T 7/20 | (2017.01) |

(52) U.S. Cl.
CPC .............. *G06T 7/70* (2017.01); *G01S 7/4808* (2013.01); *G06K 9/6218* (2013.01); *G06T 7/20* (2013.01)

(58) Field of Classification Search
None
See application file for complete search history.

(56) References Cited

U.S. PATENT DOCUMENTS

| | | | |
|---|---|---|---|
| 2009/0292468 A1 | 11/2009 | Wu et al. | |
| 2010/0253602 A1* | 10/2010 | Szczerba | G01S 13/723 345/8 |
| 2017/0124781 A1* | 5/2017 | Douillard | G01S 15/931 |

FOREIGN PATENT DOCUMENTS

| | | |
|---|---|---|
| JP | 4140118 | 8/2008 |
| JP | 2010-238132 A | 10/2010 |
| JP | 2010-249690 | 11/2010 |

(Continued)

OTHER PUBLICATIONS

Hyunggi Cho, et al. "A Multi-Sensor Fusion System for Moving Object Detection and Tracking in Urban Driving Environments", 2014 IEEE International Conference on Robotics & Automation, 2014. pp. 1836-1843.

(Continued)

*Primary Examiner* — Idowu O Osifade
(74) *Attorney, Agent, or Firm* — Oblon, McClelland, Maier & Neustadt, L.L.P.

(57) ABSTRACT

According to an embodiment, an information processing device includes an acquirer, a categorizer, a shape fitter, and a specifier. The acquirer is configured to acquire position information of each of a plurality of detection points. The categorizer is configured to cluster the detection points into one or more detection point groups each representing an object. The shape fitter is configured to apply a predetermined shape model to each detection point group on the basis of the position information of each of the clustered detection points included in the each detection point group. The specifier is configured to specify a target point of the object on the basis of the shape model.

18 Claims, 15 Drawing Sheets

(56) References Cited

FOREIGN PATENT DOCUMENTS

JP        2013-228259 A      11/2013

OTHER PUBLICATIONS

Michael S. Darms, et al. "Obstacle Detection and Tracking for the Urban Challenge", IEEE Transactions on Intelligent Transportation Systems, vol. 10, No. 3, 2009, pp. 475-485.
Sergiu Nedevschi, et al. "Stereovision-Based Sensor for Intersection Assistance", Advanced Microsystems for Automotive Applications 2009, 2009, pp. 1-21.
Fadi Fayad, et al. "Tracking objects using a laser scanner in driving situation based on modeling target shape", 2007 IEEE Intelligent Vehicles Symposium, 2007, pp. 44-49.
Dominik Steinhauser, et al. "Motion Segmentation and Scene Classification from 3D LIDAR Data", 2008 IEEE Intelligent Vehicles Symposium, 2008, pp. 398-403.
Christoph Mertz, et al. "Moving Object Detection with Laser Scanners", Journal of Field Robotics, vol. 30, No. 1, 2013, pp. 17-43.

\* cited by examiner

FIG.3

SHAPE MODEL MANAGEMENT
INFORMATION                                    10J

| SHAPE MODEL | KIND OF OBJECT | POSSIBLE SIZE RANGE | CANDIDATE POINT |
|---|---|---|---|
| SQUARE | VEHICLE (AUTOMATIC FOUR-WHEEL VEHICLE) | h: xxx TO www<br>w: yyy TO zzz | FOUR APEXES |
| RECTANGLE | VEHICLE (TRUCK) | h: xxx TO www<br>w: yyy TO zzz | FOUR APEXES |
| ⋮ | ⋮ | ⋮ | ⋮ |

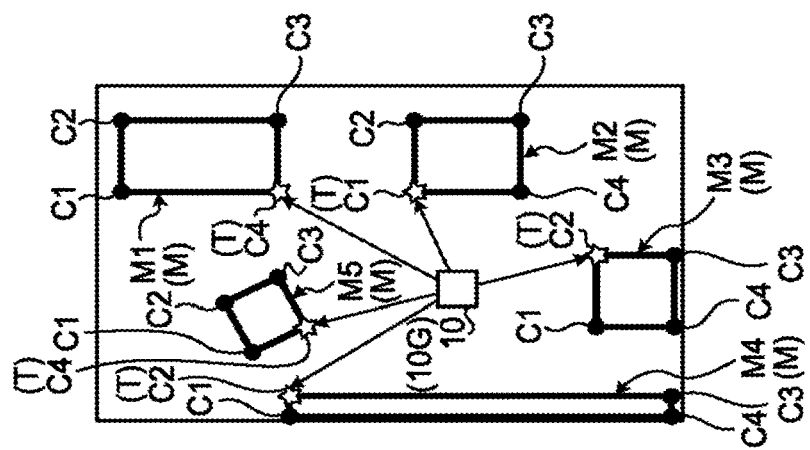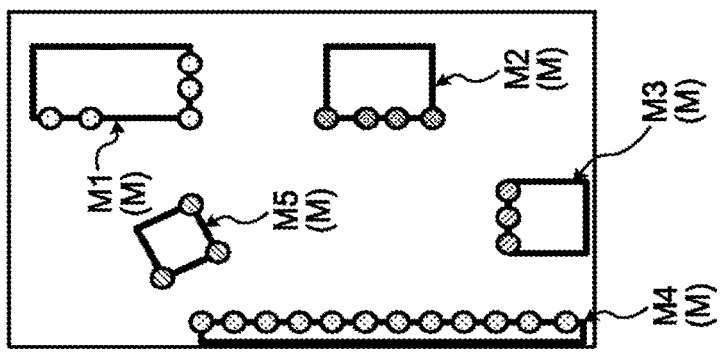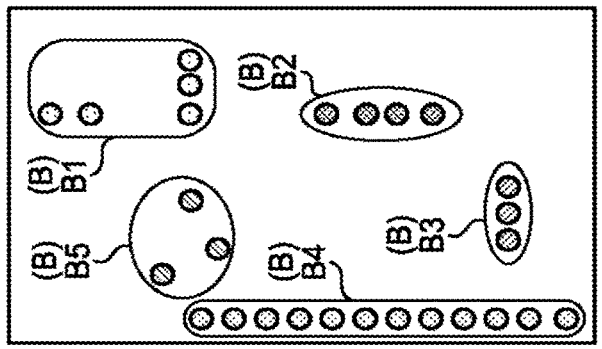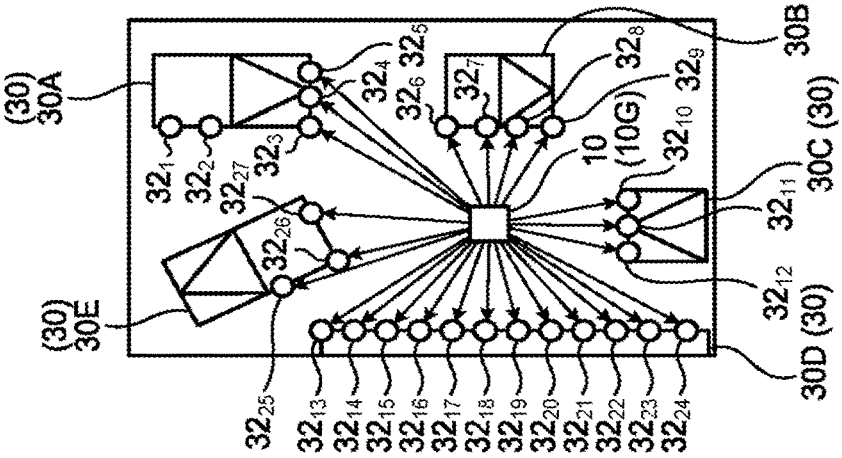

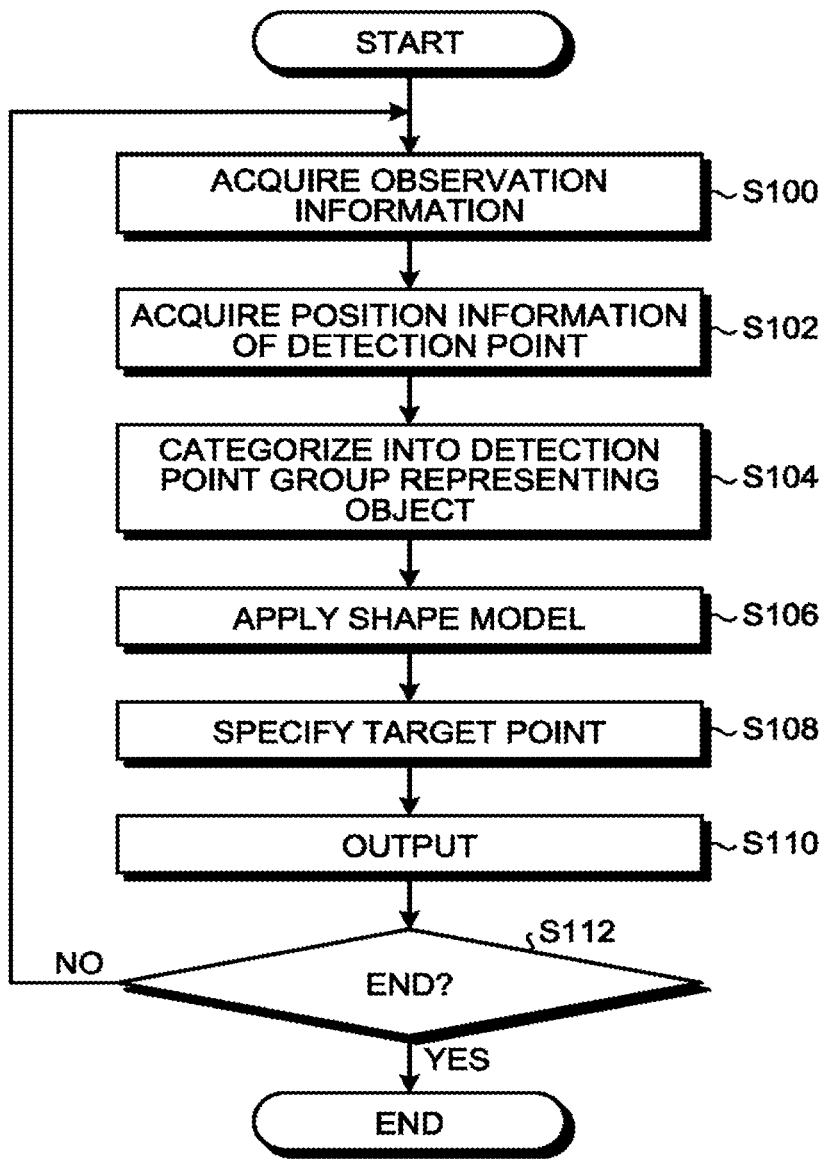

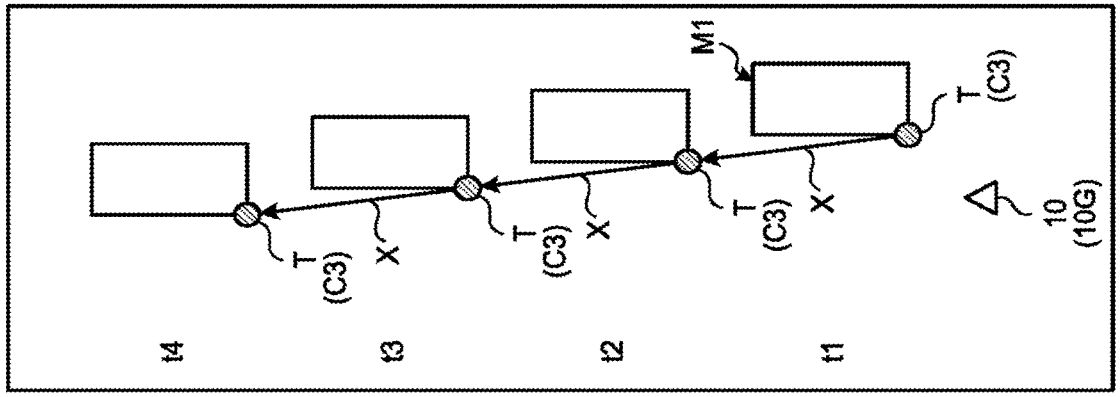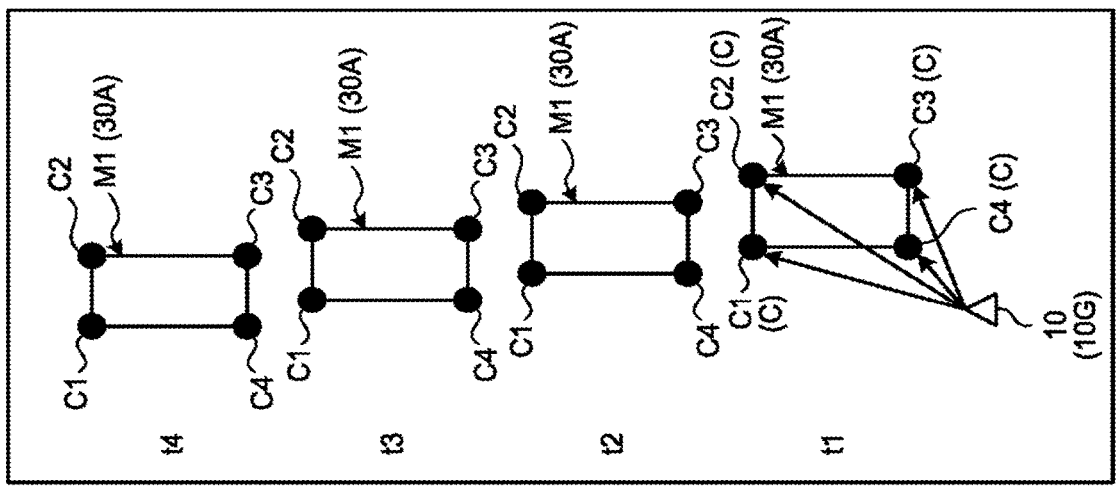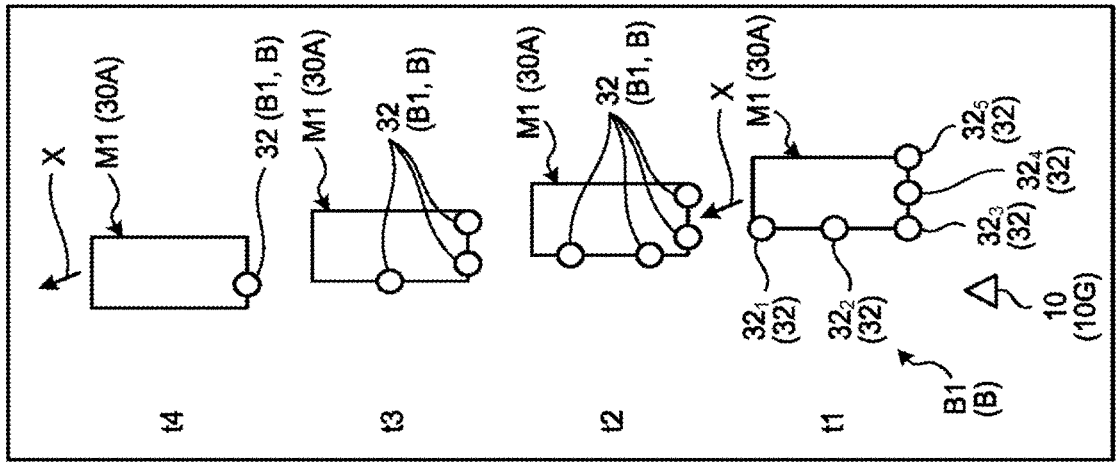

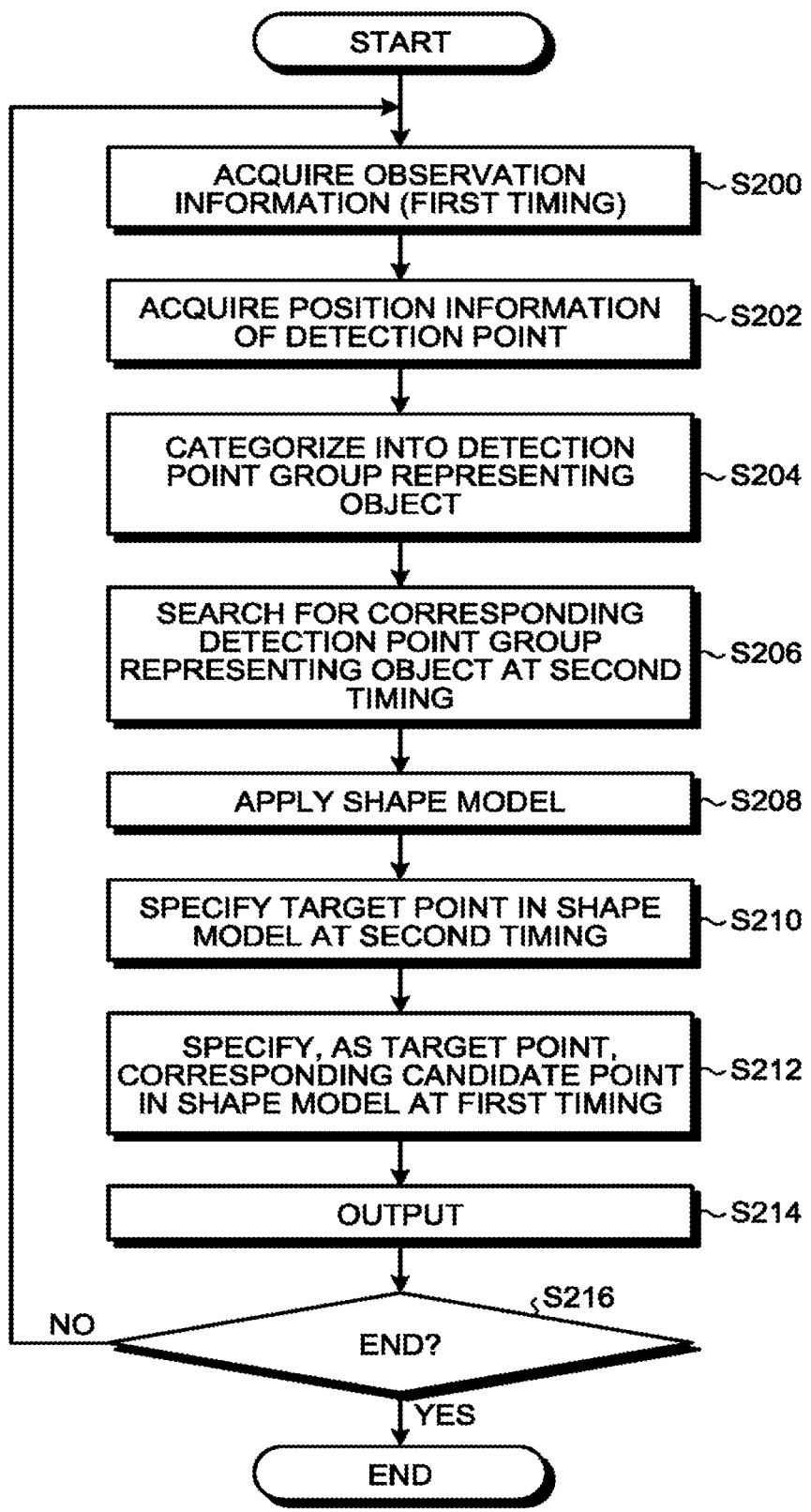

INFORMATION PROCESSING DEVICE AND INFORMATION PROCESSING METHOD FOR SPECIFYING TARGET POINT OF AN OBJECT

CROSS-REFERENCE TO RELATED APPLICATIONS

This application is based upon and claims the benefit of priority from Japanese Patent Application No. 2016-107455, filed on May 30, 2016; the entire contents of which are incorporated herein by reference.

FIELD

Embodiments described herein relate generally to an information processing device and an information processing method.

BACKGROUND

Technologies of specifying target points of an object to calculate the position, the moving speed, and the like of the object have been disclosed.

For example, Japanese Laid-open Patent Publication No. 2010-249690 discloses that when the center of an object is selected as the position of the object when the object is completely inside a detection area. Japanese Laid-open Patent Publication No. 2010-249690 also discloses that a front-end part or a back-end part of the object in the moving direction of the object is selected when the object is only partially inside the detection area. According to Japanese Laid-open Patent Publication No. 2010-249690, selected detection points are used to calculate the moving speed. Japanese Patent No. 4140118 discloses that a position of a data closest to a travel path, among a group of data representing an identical object, is set as a target point of the object.

However, a target point of an object has been conventionally calculated by simply selecting a detection point on the object, and it has been difficult to accurately specify the target point of the object.

BRIEF DESCRIPTION OF THE DRAWINGS

FIG. 3 is a pattern diagram illustrating a data configuration of shape model management information;

FIGS. 4A to 4D are explanatory diagrams of processing executed by a processing circuit;

FIG. 5 is a flowchart of the processing executed by the processing circuit;

FIGS. 6A to 6C are explanatory diagrams illustrating specification of a target point;

FIG. 10 is a flowchart of the processing executed by the processing circuit;

DETAILED DESCRIPTION

According to an embodiment, an information processing device comprising a memory; and processing circuitry configured to operate as: an acquirer configured to acquire position information of detection points; a categorizer configured to cluster the detection points into one or more detection point groups each representing an object; a shape fitter configured to fit a predetermined shape model into each detection point group on the basis of the position information of the clustered detection points belonging to the each detection point group; and a specifier configured to specify a target point of the object on the basis of the shape model.

An information processing device and an information processing method will be described in detail below with reference to the accompanying drawings.

First Embodiment

Figure 1:
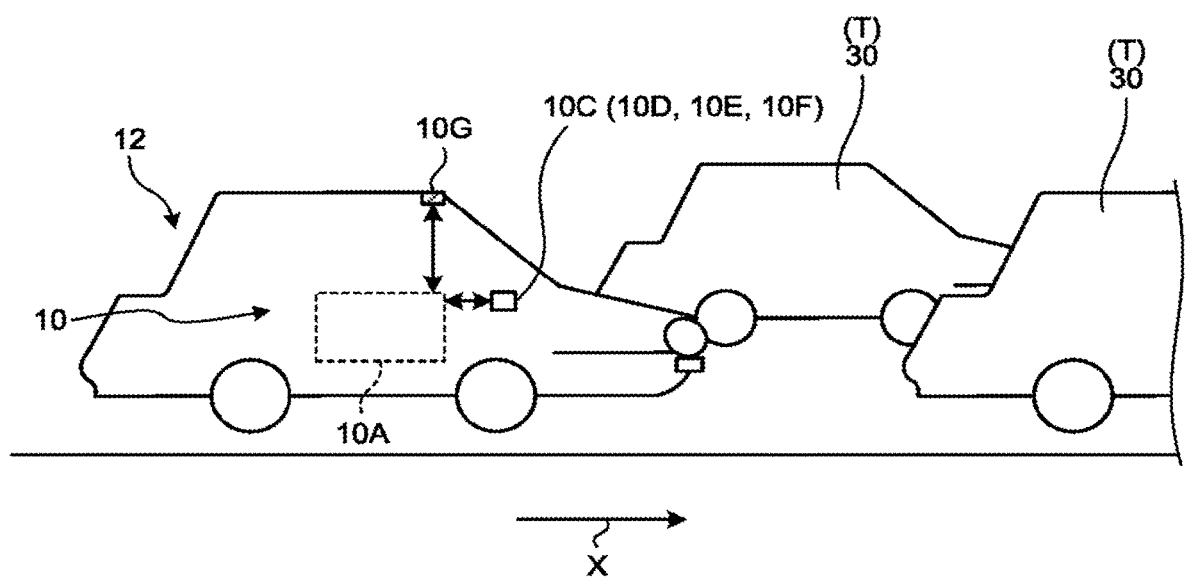
FIG. 1 is a diagram illustrating an information processing device.

FIG. 1 is a diagram illustrating an exemplary information processing device 10 according to the present embodiment. The information processing device 10 specifies a target point T of an object 30.

The present embodiment exemplarily describes a case in which the information processing device 10 is mounted on a vehicle 12. However, the information processing device 10 is not limited to the configuration in which the information processing device 10 is mounted on the vehicle 12. The information processing device 10 may be mounted on a stationary object such as an external device fixed to the ground, for example, a road. Alternatively, the information processing device 10 may be mounted on a moving object other than the vehicle 12.

The object 30 is an object, the target point T of which is specified by the information processing device 10.

Specifically, the object 30 is an object existing outside of a sensor 10G (to be described in detail later) and observed by the sensor 10G.

The object 30 may be any of a moving object and a stationary object. The moving object is a movable object. The moving object is, for example, a vehicle (a motorcycle, an automatic four-wheel vehicle, or a bicycle), a trolley, an object that can fly (a manned airplane, or an unmanned airplane (for example, a drone)), a robot, or a person. The stationary object is an object fixed to the ground. The stationary object is an immobile object or an object at rest relative to the ground. The stationary object is, for example, a guardrail, a pole, a parked vehicle, or a traffic sign. The object 30 may be any of a living object and a non-living object. The living object is, for example, a person, an animal, or a plant. The non-living object is, for example, a vehicle, an object that can fly, or a robot.

The target point T of the object 30 is a single point representing the object 30. The target point T of the object 30 is used, for example, to derive the position and the speed of the object 30. The target point T of the object 30 may be used as the position of the object 30. In the present embodiment, the information processing device 10 specifies the target point T of the object 30. A method of specifying the target point T will be described later in detail.

The information processing device 10 includes a processing circuit 10A, an output circuit 10C, and the sensor 10G.

The sensor 10G acquires observation information on the outside. The observation information represents a result of observing the surrounding of an installation position of the sensor 10G. In the present embodiment, the observation information is information from which position information on detection points around the sensor 10G can be derived.

The position information on a detection point is information representing the distance from the sensor 10G to the detection point and the direction of the detection point with respect to the sensor 10G. The distance and the direction can be expressed with, for example, position coordinates indicating a relative position of the detection point with respect to the sensor 10G, position coordinates indicating the absolute position of the detection point, and a vector.

Each detection point represents a point individually observed by the sensor 10G outside of the sensor 10G. For example, the sensor 10G emits light to the surrounding of the sensor 10G and receives light reflected at a reflection point. This reflection point corresponds to the detection point. A plurality of reflection points may be used as one detection point.

In this manner, the sensor 10G obtains observation information including the emission direction of light to each detection point (direction of the detection point with respect to the sensor 10G) and information related to light reflected at each detection point. The information related to the reflected light includes, for example, an elapsed time from emission of light to reception of the reflected light, and the intensity of the received light (or the attenuation ratio of the intensity of the received light relative to the intensity of the light emitted). The processing circuit 10A to be described later derives the distance from the sensor 10G to the detection point by using this elapsed time and the like.

The sensor 10G is, for example, an image capturing device or a distance sensor (a millimeter-wave radar or a laser sensor). The image capturing device obtains captured image data (hereinafter referred to as a captured image) through image capturing. The captured image data is, for example, digital image data including a pixel value defined for each pixel, or a depth map defining the distance from the sensor 10G to each pixel. The laser sensor is, for example, a two-dimensional laser imaging detection and ranging (LIDAR) sensor installed in parallel to a horizontal plane, or a three-dimensional LIDAR sensor.

A LIDAR sensor emits pulsed laser light to the surrounding and receives the laser light reflected at a detection point of the object 30. Then, the LIDAR sensor obtains observation information including the emission direction of the laser light and an elapsed time from the emission of the laser light to the reception thereof. Then, the processing circuit 10A to be described later calculates the distance between the sensor 10G and the detection point in the emission direction based on the elapsed time included in the observation information of the detection point. Accordingly, the processing circuit 10A to be described later acquires the position information of each detection point (to be described in detail later). The LIDAR sensor (the sensor 10G) may calculate the distance between the sensor 10G and the detection point in the emission direction based on the emission direction of the laser light and the elapsed time from the emission of the laser light to the reception thereof.

The present embodiment exemplarily describes a case in which the sensor 10G is a two-dimensional LIDAR sensor.

The sensor 10G may acquire observation information on each plane included in a surface of the object 30. Alternatively, the sensor 10G may acquire captured images in a plurality of image capturing directions different from each other. The information processing device 10 may include a plurality of sensors 10G. In this case, the information processing device 10 may include the sensors 10G of the same kind or include a plurality of sensors 10G, at least one of which is of a different kind. When the information processing device 10 includes a plurality of sensors 10G, the processing circuit 10A to be described later may use, as observation information, integration of observation information obtained by these sensors 10G.

The output circuit 10C outputs various kinds of information. In the present embodiment, the output circuit 10C outputs output information. The output information includes information related to the target point T of the object 30. Specifically, the output information includes at least one of information representing the position of the target point T of the object 30, and a moving direction, a moved distance, and a moving speed of the object 30 derived based on the target point T. The information representing the position of the target point T of the object 30 may be a position relative to the sensor 10G or an absolute position.

The output circuit 10C has, for example, a communication function of transmitting the output information, a display function of displaying the output information, and a sound outputting function of outputting sound representing the output information. For example, the output circuit 10C includes a communication circuit 10D, a display 10E, and a speaker 10F.

The communication circuit 10D transmits the output information to another device. For example, the communication circuit 10D transmits the output information through the well-known communication line. The display 10E displays the output information. The display 10E is, for example, the well-known liquid crystal display (LCD), a projection device, or a light. The speaker 10F outputs sound representing the output information.

Figure 2:
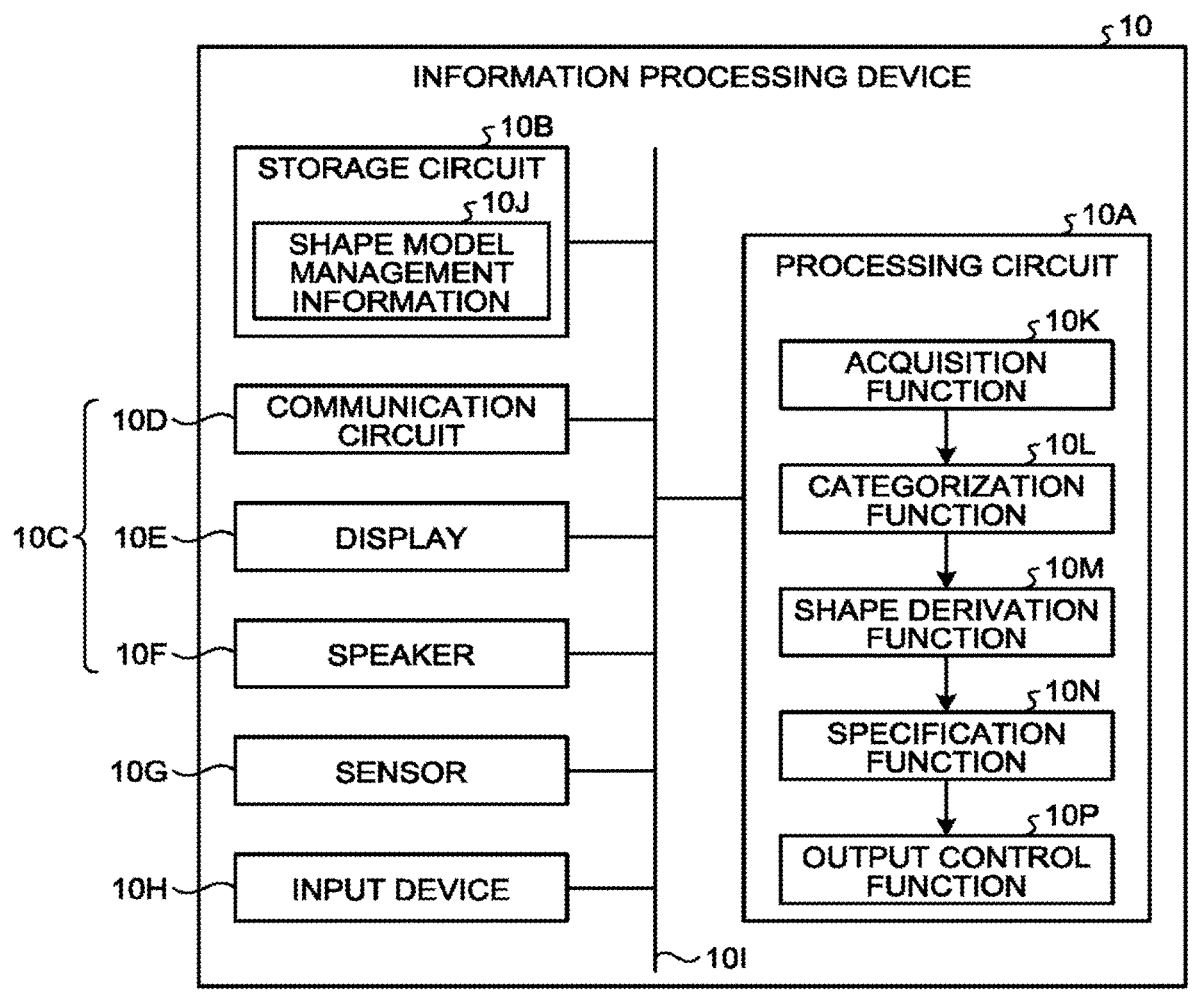
FIG. 2 is a block diagram illustrating the configuration of the information processing device.

The following describes the configuration of the information processing device 10 in detail. FIG. 2 is a block diagram of an exemplary configuration of the information processing device 10.

The information processing device 10 specifies the target point T of the object 30. The information processing device 10 is, for example, a dedicated or generalized computer. The information processing device 10 includes the processing circuit 10A, a storage circuit 10B, the output circuit 10C, the sensor 10G, and an input device 10H. As described above, the output circuit 10C includes the communication circuit 10D, the display 10E, and the speaker 10F.

The processing circuit 10A, the storage circuit 10B, the output circuit 10C, the sensor 10G, and the input device 10H are connected with each other through a bus 10I. The processing circuit 10A may be connected in a wired or wireless manner with the storage circuit 10B, the output circuit 10C (the communication circuit 10D, the display 10E, and the speaker 10F), the sensor 10G, and the input device 10H. The processing circuit 10A may be connected through a network with at least one of the storage circuit 10B, the output circuit 10C (the communication circuit 10D, the display 10E, and the speaker 10F), the sensor 10G, and the input device 10H.

The input device 10H receives inputting of various kinds of instructions and information from a user. The input device 10H is, for example, a pointing device such as a mouse or a track ball, or an input device such as a keyboard.

The storage circuit 10B stores therein various kinds of data. The storage circuit 10B is, for example, a semiconductor memory element such as a random access memory (RAM) or a flash memory, a hard disk, or an optical disk. Alternatively, the storage circuit 10B may be a storage device provided outside of the information processing device 10. Alternatively, the storage circuit 10B may be a storage medium. Specifically, the storage medium may store or temporarily store a computer program and various kinds of information downloaded through, for example, a local area network (LAN) and the Internet. The storage circuit 10B may include a plurality of storage media.

In the present embodiment, the storage circuit 10B stores therein shape model management information 10J. The shape model management information 10J is information for managing a shape model. The shape model management information 10J is not limited to a particular data format. For example, the shape model management information 10J is a database or a table.

The shape model is a model representing the shape of the surface of the object 30. Specifically, the shape model represents a shape indicated by an outline of the object 30 when viewed from outside. In other words, the shape model represents the surface shape of the object 30, which is observable by, for example, a sensor.

The shape model may be any model representing the surface shape of the object 30, and the format thereof is not limited. For example, when the object 30 is an automatic four-wheel vehicle, a rectangle approximating the surface shape of the automatic four-wheel vehicle projected onto the horizontal plane is used as the shape model of the object 30. Alternatively, the shape model may be, for example, a plane shape such as a polygon or an ellipse, a combination of one line segment or more, or a cubic shape (for example, rectangular parallelepiped).

FIG. 3 is a pattern diagram illustrating an exemplary data configuration of the shape model management information 10J. The shape model management information 10J includes a shape model, an object type, a possible size range, and a candidate point in association with each other.

A shape model registered to the shape model management information 10J may be characteristic information indicating characteristics of the shape model, or information (a square or a rectangle, for example) indicating a shape represented by the shape model.

The object kind is information indicating the kind of the object 30 having the shape represented by the shape model. The possible size range indicates a possible range of the size of the object 30 of the corresponding kind in observation information. The possible size range is expressed with, for example, the range of the height h of the object 30 of the corresponding kind in a captured image as observation information (for example, a length of the object 30 in a first direction in a two-dimensional plane along the captured image or the horizontal plane), and the range of the width w (for example, a length in a second direction orthogonal to the first direction in the two-dimensional plane) of the object 30. The format of the expression of the possible size range is not limited to the format illustrated in FIG. 3.

The candidate point is a point in the shape model, which is a candidate for the target point T. In the shape model management information 10J, at least two candidate points are set to one shape model in advance.

The candidate point is a point in the shape model, indicating the object 30 of the corresponding kind.

For example, the candidate point is a point in the object 30 having the corresponding shape model, which is likely to be externally observed. When a point is likely to be externally observed, the probability or frequency of being observed when the object 30 is observed in various directions is equal to or higher than a threshold. Specifically, the candidate point is preferably a point observable by the sensor 10G at a frequency equal to or higher than the threshold when the object 30 and the sensor 10G are in different positional relations. This threshold is set in advance. The threshold may be changeable as appropriate in accordance with an operation instruction input through the input device 10H by the user.

Specifically, when the shape model is a polygon such as a square or a rectangle, the candidate point is each apex (for example, four apexes for a rectangle shape) as an intersection point of two adjacent sides of the polygon. Alternatively, when the shape model is a polygon, the candidate point may be the middle point of each side of the polygon or an intersection point of line segments.

The candidate point may be a point indicating a characteristic shape or material of the object 30 having the corresponding shape model. For example, when the sensor 10G is a LIDAR sensor, the candidate point of the shape model is set to be a region in which laser light emitted from the LIDAR sensor is correctly reflected. When the sensor 10G is a LIDAR sensor, the candidate point of the shape model is preferably not set to be a region (a black region or a transparent region) in which laser light emitted from the sensor 10G is not correctly reflected.

When the object 30 is a mixture of a rigid body and a non-rigid body, the candidate point may be set to be the region of the rigid body. For example, when the object 30 is a bicycle on which a person is riding, a part corresponding to the person potentially deforms. For this reason, in this case, the candidate point can be set to be the body (for example, a frame part) of the bicycle.

The candidate point may include a point inside the object 30 having the corresponding shape model. The inside point is a point inside the outline of the object 30, including an externally invisible point. For example, the candidate point may include a point indicating the barycenter of the object 30 having the shape model.

The shape model management information 10J may include at least association of a shape model and a plurality of candidate points. Thus, the shape model management information 10J may include no registration of at least one of the object type and the possible size range. The shape model management information 10J may be set in advance. The shape model management information 10J may be changeable as appropriate in accordance with, for example, an operation instruction through the input device 10H by the user.

The shape model management information 10J may be association of a shape model and a plurality of candidate points corresponding to each of various directions in which one object 30 is viewed.

The description continues with reference to FIG. 2. The processing circuit 10A will be described below. The processing circuit 10A has an acquisition function 10K, a categorization function 10L, a shape fitting function 10M, a specification function 10N, and an output control function 10P.

Each processing function of the processing circuit 10A is stored in the storage circuit 10B in the form of a computer-executable program. The processing circuit 10A is a processor configured to achieve the function corresponding to each program by reading the storage circuit 10B from the program and executing the program.

Having read each program, the processing circuit 10A has the corresponding function illustrated in the processing circuit 10A illustrated in FIG. 2. In the following description with reference to FIG. 2, the acquisition function 10K, the categorization function 10L, the shape fitting function 10M, the specification function 10N, and the output control function 10P are achieved by the single processing circuit 10A.

The processing circuit 10A may be configured as a combination of a plurality of independent processors for achieving the respective functions. In this case, each processor achieves a function by executing a computer program. Each processing function is achieved as a computer program, and these computer programs may be executed by one processing circuit, or a particular function may be achieved by an independently dedicated program execution circuit.

The "processor" used in the present embodiment and embodiments to be described later is, for example, a circuit of a central processing unit (CPU), a graphical processing unit (GPU), an application specific integrated circuit (ASIC), or a programmable logic device (for example, a simple programmable logic device (SPLD), a complex programmable logic device (CPLD), or a field programmable gate array (FPGA)). The processor achieves a function by reading and executing a computer program stored in the storage circuit 10B. The computer program may be directly incorporated in a circuit of the processor instead of being stored in the storage circuit 10B. In this case, the processor achieves a function by reading and executing the computer program incorporated in the circuit.

The acquisition function 10K is an exemplary acquirer. The acquisition function 10K acquires position information of detection points.

The acquisition function 10K acquires observation information on the surrounding of the sensor 10G from the sensor 10G. As described above, the observation information is observation information on the outside of the sensor 10G, from which position information of each of detection points around the sensor 10G can be derived. The acquisition function 10K derives the position information of each detection point from the observation information. In this manner, the acquisition function 10K acquires the position information of the detection points.

Specifically, assume that the sensor 10G is a LIDAR sensor. In this case, the acquisition function 10K acquires, from the sensor 10G, observation information including the emission direction of laser light and the elapsed time from the emission of the laser light to the reception thereof. Then, the acquisition function 10K calculates, from the elapsed time, the distance between the sensor 10G and each detection point in the emission direction. In this manner, the acquisition function 10K acquires, for each detection point, position information indicating the distance from the sensor 10G to the detection point and the direction of the detection point with reference to the sensor 10G.

When the sensor 10G is a LIDAR sensor as described above, the sensor 10G may calculate the position information (the emission direction and the distance) from the emission direction of the laser light and the elapsed time from the emission of the laser light to the reception thereof. In this case, the acquisition function 10K may acquire the position information of each detection point from the sensor 10G (LIDAR sensor).

As described above, the sensor 10G is configured to obtain observation information on each plane included in the surface of the object 30 in some cases. In such a case, the acquisition function 10K may acquire position information of a detection point by projecting each of the different planes indicated by the observation information onto the horizontal plane. The sensor 10G is also configured to obtain images captured in a plurality of image capturing directions different from each other in some cases. In such a case, the acquisition function 10K may estimate three-dimensional position information of each detection point by restructuring depth information (distance information) on the detection point based on images captured in a plurality of image capturing directions and acquired from the sensor 10G. The sensor 10G includes a plurality of sensors 10G in some cases. In such a case, the acquisition function 10K may integrate observation information obtained by these sensors 10G, and may use the integrated observation information to acquire position information of each detection point.

FIGS. 4A to 4D are explanatory diagrams of processing executed by the processing circuit 10A. FIG. 4A is an explanatory diagram of acquisition of position information by the acquisition function 10K. As illustrated in FIG. 4A, the sensor 10G emits light around the sensor 10G and receives light reflected by the objects 30 (objects 30A to 30E) around the sensor 10G. In this manner, the sensor 10G obtains observation information on each of detection points 32 (for example, detection points $32_1$ to $32_{27}$) corresponding to reflection points on the objects 30 (objects 30A to 30E). The positions of the objects 30, the number of objects 30, the number of detection points 32, and the positions of the detection points 32 are exemplary, and the present embodiment is not limited to the configuration illustrated in FIGS. 4A to 4D.

The acquisition function 10K acquires position information of the detection points 32 (for example, the detection points $32_1$ to $32_{27}$) from the observation information.

The description continues with reference to FIG. 2. The categorization function 10L is an exemplary categorizer. The categorization function 10L clusters the detection points 32, the position information of which is acquired by the acquisition function 10K, into detection point groups representing the object 30. Specifically, the categorization function 10L categorizes the detection points 32 into a plurality of categories. The categories include at least the object 30. The categories may include an element other than the object 30.

FIG. 4B is an explanatory diagram of the categorization by the categorization function 10L. The categorization function 10L clusters the detection points 32 into detection point groups B representing the object 30 based on the position information of each detection point 32.

For example, assume that the sensor 10G is a two-dimensional LIDAR sensor. In this case, the categorization function 10L applies a number to (orders) each detection point 32 sequentially in the circumferential direction of a two-dimensional circle along the horizontal plane having the sensor 10G at its center.

Then, in an order of the applied number, the information processing device 10 determines whether each detection point 32 represents the same object 30 to which the previous detection points 32 represents. For example, if a difference between a distance (distance to the sensor 10G) indicated by the position information of the previous detection points 32 and a distance indicated by the position information of the detection point 32 to be processed is equal to or smaller than a threshold, the categorization function 10L determines that these detection points 32 represents the same object 30. Then, the categorization function 10L repeats the determination on the detection points 32 sequentially in the circumferential direction until the detection point 32 to be processed and its previous detection point 32 are determined not to represent the same object 30. Then, a group of the detection points 32 determined to represent the same object 30 is clustered as a detection point group B representing one object 30.

In the example illustrated in FIGS. 4A and 4B, this categorization processing clusters the detection points 32 (detection points $32_1$ to $32_{27}$) into one or more detection point groups B (detection point groups B1 to B5) representing the respective objects 30.

A method of the categorization by the categorization function 10L is not limited to the above-described method. Specifically, in the above description, the detection points 32 are ordered sequentially in the circumferential direction of a two-dimensional circle having its center at the sensor 10G, and then the categorization processing is performed. However, a method of the ordering of the detection points 32 is not limited to this method.

The criterion of the determination of whether the detection points 32 represent the same object 30 is not limited to the above-described criterion. For example, the categorization function 10L may use position coordinates indicating the relative positions of the detection points 32 with respect to the sensor 10G and the absolute positions of the detection points 32 as criteria of the determination. Alternatively, the categorization function 10L may determine whether distances from a plurality of detection points 32 determined to represent the same object 30 to a detection point 32 to be determined next are equal to or smaller than a threshold so as to determine whether the detection point 32 to be determined next represents the same object 30. Alternatively, the categorization function 10L may determine whether detection points 32 represent the same object 30 based on a reflection intensity of light included in the observation information of the detection points 32.

The description continues with reference to FIG. 2. The shape fitting function 10M is an exemplary shape fitter. The shape fitting function 10M applies a predetermined shape model to a detection point group B based on position information of each detection point 32 belonging to the detection point group B. In other words, the shape fitting function 10M applies a shape model M to each detection point group B based on position information of each of detection points 32 clustered as the corresponding object 30.

Specific description will be made below with reference to FIGS. 4A to 4D. FIG. 4C is an explanatory diagram illustrating exemplary application of the shape model M by the shape fitting function 10M.

For example, the shape fitting function 10M applies the shape model M to each detection point group B by using a shape model of one kind, which is determined in advance, through adjustments such as change of coordinates, angle change (barycenter rotation) in a long-side direction, and deformation of the lengths of sides.

The following describes an example in which the shape fitting function 10M prepares a rectangle as the kind of the shape model for application of the shape model M to an object 30 (for example, an automatic four-wheel vehicle) around the sensor 10G. The shape fitting function 10M applies a rectangle as the shape model to detection point groups B (detection point groups B1 to B5) (refer to FIG. 4B).

For example, the shape fitting function 10M has, as variables of a rectangle as the shape model, the coordinates of the rectangle, an angle in one reference direction, indicating the posture of the rectangle, and the lengths of sides of the rectangle. Then, for each detection point group B representing one object 30 and projected onto the horizontal plane, the shape fitting function 10M sets initial values to the variables of the rectangle as a prepared shape model. In addition, the shape fitting function 10M slightly changes the variables from the initial values and performs scanning to define, as the shape model, one rectangle for which the variables minimize an evaluating function. Accordingly, the defined shape model applies as the shape model M of the detection point group B.

For example, when the kind of the shape model is a rectangle, the coordinates, the angle (angle of the long-side direction relative to one coordinate axis), and the lengths of sides of a rectangle having a minimum area to enclose a detection point group B to be processed are set as the initial values of the variables of the shape model. A method of setting the initial values is not limited to this method. For example, the shape fitting function 10M may employ a method of detecting a straight line by performing a Hough transform on the detection point group B and setting the straight line to be one side of a rectangle as an initial shape model.

The evaluating function uses, for example, the sum of a shortest distance between each detection point 32 belonging to a detection point group B and a side of an applied shape model.

The shape fitting function 10M adjusts the variables of a shape model to define one shape model for which the evaluating function has a minimum value. Then, the shape fitting function 10M uses the defined shape model as the shape model M to be applied to the corresponding detection point group B. In this manner, the shape fitting function 10M applies the shape model M to the detection point group B representing an object 30.

The shape fitting function 10M may use, as the evaluating function, a longest distance among the above-described shortest distances of a plurality of detection points 32 belonging to a detection point group B. Specifically, the shape fitting function 10M may calculate the evaluating function by using one detection point 32 for which a shortest distance from a side of an applied initial shape model is largest among the detection points 32 belonging to the detection point group B.

Alternatively, the shape fitting function 10M may use, as the evaluating function, each detection point 32 weighted in accordance with position information of the detection point 32.

For example, the shape fitting function 10M may fit the shape model M into a detection point group B representing a certain object 30 by using a plurality of detection points 32 belonging to a detection point group B representing the object 30, and one or more detection points 32 belonging to a detection point group B representing another object 30.

In this case, the shape fitting function 10M uses, as the evaluating function, the number of detection points 32 (referred to as other detection points 32) included in a detection point group B to be processed and also belonging to another detection point group B, or the number of points at which a straight line connecting the sensor 10G and each of the other detection points 32 intersects with an initial shape model applied to the detection point group B to be processed.

The shape fitting function 10M may use the sum of these plurality of kinds of evaluating functions as the evaluating function used for application of the shape model M.

The shape fitting function 10M may fit the shape model M into a detection point group B by using another method.

For example, the shape fitting function 10M may determine the type of an object 30 from a detection point group B, select the shape model M related to the type of the object 30, and fit the shape model M into the detection point group B.

For example, the shape fitting function 10M sets in advance the shape model M different for each type of an object 30. Specifically, the shape fitting function 10M sets in advance a circular shape model M for the type "person" of the object 30, a rectangular shape model M for the type "automatic four-wheel vehicle" of the object 30, and a linear shape model M for the type "guardrail" of the object 30.

Then, the shape fitting function 10M may select the shape model M related to the type of the object 30 determined from the detection point group B. In this manner, the shape fitting function 10M can fit a different type of the shape model M in accordance with a result of determination of the type of the object 30.

The shape fitting function 10M may fit the shape model M into a detection point group B by additionally using the "possible size range" related to the type of an object 30 in the shape model management information 10J (refer to FIG. 3). In this case, the "possible size range" may be determined in advance for each type of the object 30. For example, when the shape of the shape model M is a rectangle, the size of the rectangle differs in accordance with the type of the related object 30. Thus, the "possible size range" may employ an average size of the types (a bicycle, an automatic four-wheel vehicle, or a bus, for example) of the corresponding object 30.

Then, the information processing device 10 may add the size (for example, the length of a side of a rectangle) of the shape model as a variable of the application to the detection point group B, set a search range in which the variable of the size can be changed as the "possible size range" related to the type of the object 30, and fit the shape model M into the detection point group B.

Accordingly, for example, as illustrated in FIGS. 4B and 4C, a shape models M1 to M5 are applied to the respective detection point groups B1 to B5.

The description continues with reference to FIG. 2. The specification function 10N is an exemplary specifier. The specification function 10N specifies the target point T of the object 30 based on the shape model M applied by the shape fitting function 10M. Specifically, the specification function 10N specifies, based on the shape model M, the target point T of the object 30 corresponding to the detection point group B to which the shape model M is fitted.

In the present embodiment, the specification function 10N specifies, as the target point T of the object 30, one of candidate points set to the shape model M in advance.

FIG. 4D is an explanatory diagram illustrating exemplary specification of the target point T by the specification function 10N. For example, assume that, for each of the shape models M1 to M5, four apexes (candidate points C1 to C4) of the rectangular shape model M are set as candidate points C related to the shape model M in advance. In this case, for each of the shape models M (shape models M1 to M5) applied for the respective detection point groups B, the specification function 10N specifies, as the target point T, one of candidate points C (candidate points C1 to C4) of the shape model M.

The specification function 10N may read, from the shape model management information 10J, the candidate points C related to the shape model M fitted by the shape fitting function 10M, and use the candidate points C for specification of the target point T.

Specifically, the specification function 10N sets the candidate points C related to the shape model M in advance. In the present embodiment, the specification function 10N may set the candidate points C in advance by registering the shape model M and the candidate points C in association with each other to the shape model management information 10J (refer to FIG. 3) in advance.

The specification function 10N specifies, as the target point T, one of the candidate points set in advance to the applied shape model M.

For example, the specification function 10N specifies, as the target point T, a candidate point C closest to the position of the sensor 10G among the candidate points C set in advance to the shape model M.

This position of the sensor 10G may be the position of the sensor 10G when the observation information is acquired. The specification function 10N may specify the position of each candidate point C based on position information of each detection point 32 and a relative positional relation between each candidate point C in the shape model M and each detection point 32 belonging to a detection point group B. Then, the specification function 10N specifies, as the target point T, a candidate point C at a position closest to the position of the sensor 10G among the candidate points C set in advance to the shape model M.

As described above, the shape model M is fitted to each detection point group B of detection points 32 representing an object 30. The acquisition function 10K acquires position information of each detection point 32. Thus, the specification function 10N can acquire the relative positional relation between each candidate point C set to the shape model M and each detection point 32 belonging to the detection point group B.

The following description will be made with reference to FIG. 4D. For example, assume that candidate points C (candidate points C1 to C4) are set to the shape model M1 fitted to the detection point group B1 (refer to FIG. 4B) of the object 30A (refer to FIG. 4D). In this case, the specification function 10N specifies, as the target point T of the object 30A, the candidate point C4 closest to the position of the sensor 10G among the candidate points C (candidate points C1 to C4) of the shape model M1.

Similarly for each of the shape models M2 to M5 fitted to the respective detection point groups B2 to B5, the specification function 10N specifies a candidate point C closest to the position of the sensor 10G (in the example illustrated in FIG. 4D, the candidate point C1 of the shape model M2, the candidate point C2 of the shape model M3, the candidate point C2 of the shape model M4, and the candidate point C4 of the shape model M5) among candidate points C as the target point T of the object 30 (objects 30B to 30E) related to each of the shape models M (shape models M2 to M5).

The specification function 10N may specify, as the target point T of the object 30, a candidate point C closest to detection points 32 belonging to a detection point group B to which the shape model M is applied among candidate points C set in advance to a shape model M. Specifically, the specification function 10N may specify a candidate point C, closest to which a detection point 32 exists, among the candidate points C set in advance to the shape model M, as the target point T of the object 30.

Alternatively, the specification function 10N may specify, as the target point T of the object 30, a candidate point C having a highest distribution rate of detection points 32 belonging to a detection point group B among candidate points C set in advance to the shape model M.

The distribution rate of detection points 32 represents a ratio of detection points 32 existing around a candidate point C. The distribution rate of detection points 32 indicates a larger value for a larger number of detection points 32 positioned closer to the candidate point C. For example, the distribution rate of detection points 32 at the candidate point C is expressed as the sum of values applied to detection points 32 positioned in a predetermined range from the candidate point C, where a larger value is applied to a detection point 32 positioned closer to the candidate point C.

Then, a candidate point C having a highest distribution rate of detection points 32 among the candidate points C of the shape model M fitted to the detection point group B of the object 30 may be specified as the target point T of the object 30.

In other words, the specification function 10N can specify the target point T of the object 30 based on the distribution rate by specifying the target point T by using, among detection points 32 belonging to the detection point group B, the number of detection points 32 included in the predetermined range from a candidate point C and the distance from the candidate point C to a detection point 32 closest to the candidate point C.

The fitness of the shape model M to the candidate point C is more relevant for a higher distribution rate of detection points 32. Thus, the specification function 10N can achieve an improved accuracy of specification of the target point T of the object 30 by specifying a candidate point C having a highest distribution rate of detection points 32 as the target point T. In addition, any unstable candidate point C with a few surrounding detection points 32 among a plurality of candidate points C set to the shape model M can be excluded as the target point T. Thus, the specification function 10N can accurately specify the target point T of the same object 30 in observation information of observations at different timings.

The output control function 10P is an exemplary output unit. The output control function 10P outputs the output information indicating the target point T of an object 30 from the output circuit 10C. Alternatively, the output control function 10P may store the output information in the storage circuit 10B. Alternatively, the output control function 10P may output the output information to any other processing functional component (for example, a function that performs collision determination or motion prediction). Alternatively, the output control function 10P may perform at least two of the storage of the output information in the storage circuit 10B, the outputting of the output information, and the outputting of the output information to any other processing functional component.

As described above, the output information includes information related to the target point T of the object 30. Specifically, the output information includes at least one of information indicating the position of the target point T of the object 30, and the moving direction, moved distance, and moving speed of the object 30 derived based on the target point T.

For example, the output control function 10P outputs, from the output circuit 10C, the output information related to the target point T of the object 30 represented by each detection point group B clustered by the categorization function 10L.

Accordingly, the communication circuit 10D of the output circuit 10C transmits the output information related to the target point T to, for example, an external device. For example, the output information is displayed on the display 10E of the output circuit 10C. For example, the speaker 10F of the output circuit 10C outputs sound in accordance with the output information. The sound in accordance with the output information may be sound indicating the output information, or warning by sound in accordance with the output information.

The following describes the procedure of processing executed by the processing circuit 10A. FIG. 5 is a flowchart of an exemplary procedure of the processing executed by the processing circuit 10A.

First, the acquisition function 10K acquires the observation information from the sensor 10G (step S100). Subsequently, the acquisition function 10K acquires position information of each detection point 32 from the observation information acquired at step S100 (step S102).

Subsequently, the categorization function 10L clusters detection points 32, the position information of which is acquired at step S102, into a detection point group B representing an object 30 (step S104). Subsequently, the shape fitting function 10M fits a shape model M to the detection point group B clustered at step S104 (step S106). If the shape fitting function 10M clusters the detection points 32 into detection point groups B in the processing at step S104, the shape fitting function 10M fits shape models M to the respective detection point groups B.

Subsequently, the specification function 10N specifies the target point T of the object 30 based on the shape model M fitted at step S106 (step S108). If the shape fitting function 10M fits shape models M to the respective detection point group B in the processing at step S106, the specification function 10N specifies the target point T for each of objects 30 corresponding to the respective shape models M.

Subsequently, the specification function 10N outputs the output information related to the target point T specified at step S108 from the output circuit 10C (step S110).

Subsequently, the processing circuit 10A determines whether to end the processing (step S112). For example, the processing circuit 10A performs the determination at step S112 by determining whether a signal indicating end of the processing has been received from the input device 10H. If the determination at step S112 is negative (No at step S112), the present routine returns to the above-described step S100. If the determination at step S112 is positive (Yes at step S112), the present routine is ended.

Through execution of the above-described processing, each time the sensor 10G acquires observation information, the processing circuit 10A fits a shape model M to a detection point group B based on position information of each detection point 32 acquired from the observation information, and specifies the target point T of an object 30 based on the shape model M. Thus, the target point T of the object 30 can be specified for a plurality of pieces of observation information different from each other in, for example, the observation time.

FIGS. 6A to 6C are explanatory diagrams illustrating exemplary specification of the target point T by the processing circuit 10A according to the present embodiment. Assume that the object 30A represented by a shape model M1 is moving in a direction (the direction of arrow X) away from the sensor 10G. Then, assume that the sensor 10G acquires observation information at each of time t1, time t2, time t3, and time t4.

Then, assume that the processing circuit 10A executes the processing at the above-described steps S100 to S112 at each acquisition of the observation information at each of time t1, time t2, time t3, and time t4.

In this case, the acquisition function 10K acquires position information of detection points 32 (detection points $32_1$ to $32_5$) representing the object 30A at each of time t1, time t2, time t3, and time t4 (refer to FIG. 6A). Then, the categorization function 10L and the shape fitting function 10M fit the shape model M1 into the detection point group B1 representing the object 30A at each of time t1, time t2, time t3, and time t4 (refer to FIGS. 6A and 6B).

The specification function 10N specifies, as the target point T, one of candidate points C of the shape model M1 fitted at each of time t1, time t2, time t3, and time t4. The example illustrated in FIGS. 6A to 6C illustrates a case in which the specification function 10N specifies, as the target point T, a candidate point C4 closest to the sensor 10G among candidate points C of the shape model M1 fitted at each of time t1, time t2, time t3, and time t4.

Specifically, the specification function 10N specifies the position of each candidate point C (candidate points C1 to C4) set to the applied shape model M1. In the example illustrated in FIGS. 6A to 6C, the specification function 10N specifies the positions of four apexes of the rectangular shape model M1.

Subsequently, the specification function 10N specifies the position of the sensor 10G at each time (time t1, time t2, time t3, or time t4) at which the observation information is acquired. In the present embodiment, the specification function 10N uses the position of the information processing device 10 as the position of the sensor 10G, assuming that the sensor 10G is installed in the information processing device 10. Alternatively, the relative position of the sensor 10G to each detection point 32 may be used as the position of the sensor 10G.

Then, the specification function 10N calculates the distance between the sensor 10G and each of candidate points C (candidate points C1 to C4) included in the shape model M1. The specification function 10N specifies, as the target point T, the candidate point C4 having a shortest distance to the sensor 10G among the candidate points C1 to C4 set to the shape model M1, for each time (time t1, time t2, time t3, or time t4) at which the observation information is acquired.

In this manner, the specification function 10N specifies, as the target point T, one of candidate points C set to the shape model M1 in advance. Thus, the target point T of the object 30 can be reliably specified when the observation information is acquired at different times.

As described above, the information processing device 10 according to the present embodiment includes the acquisition function 10K, the categorization function 10L, the shape fitting function 10M, and the specification function 10N. The acquisition function 10K acquires position information of each of detection points 32. The categorization function 10L clusters detection points 32 into a detection point group B representing an object 30. The shape fitting function 10M fits a predetermined shape model M into the detection point group B based on the position information of each clustered detection point 32 belonging to the detection point group B. The specification function 10N specifies a target point T of the object 30 based on the shape model M.

In this manner, the information processing device 10 according to the present embodiment specifies the target point T of the object 30 based on the shape model M fitted into the detection point group B representing the object 30.

Thus, the information processing device 10 according to the present embodiment can accurately specify the target point T of the object 30.

In the present embodiment, the specification function 10N specifies, as the target point T of the object 30, one of candidate points set in advance to the shape model M. Thus, in the information processing device 10 according to the present embodiment, the same position on the object 30 can be specified as the target point T. Specifically, when the same object 30 is included in a plurality of pieces of the observation information different from each other in, for example, a time or an observation direction, the same position on the object 30 can be specified as the target point T.

The target point T of the object 30 specified by the information processing device 10 according to the present embodiment can be used to derive, for example, the position of the object 30, the moving distance of the object 30, and the moving speed of the object 30.

For example, as illustrated in FIG. 6C, the specification function 10N may calculate at least one of the moving direction, the moving distance, and the moving speed of the object 30A using the target point T of the object 30A specified at each of time t1, time t2, time t3, and time t4.

In this case, the specification function 10N calculates, for example, the direction of a straight line (refer to the direction of arrow X in FIG. 6D) connecting the target points T of the object 30A specified at different times as the moving direction of the object 30A. The specification function 10N also calculates, for example, the distance between the target points T specified at different times as the moving distance of the object 30A between the times. The specification function 10N also calculates the moving speed of the object 30A using, for example, the distance between the target points T specified at different times and the interval between the times.

Thus, in addition to the above-described effect, the information processing device 10 according to the present embodiment can highly accurately derive at least one of the position, the moving distance, and the moving speed of the object 30 using the target points T of the object 30 specified by the information processing device 10 according to the present embodiment.

Different positions on the same object 30 are specified as the target points T in some cases depending on a positional relation between the object 30 and the sensor 10G.

Figure 7:
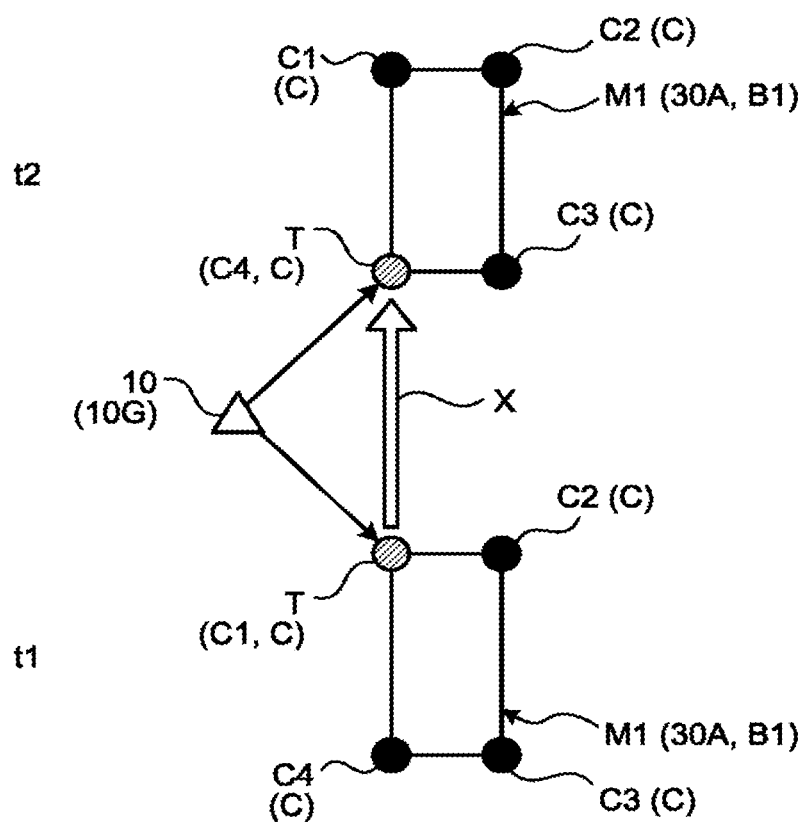
FIG. 7 is an explanatory diagram of specification of different positions as target points.

FIG. 7 is an explanatory diagram of a case in which different positions on the object 30 are specified as target points T. As illustrated in FIG. 7, assume that the object 30A moves toward the sensor 10G and then moves away from the sensor 10G (refer to the direction of arrow X in FIG. 7).

Then, assume that the specification function 10N specifies, as the target point T, a candidate point C closest to the sensor 10G among candidate points C (candidate points C1 to C4) set to the shape model M1 applied to the detection point group B1 of the object 30A. In this case, the target point T of the object 30A specified based on observation information observed at time t1 is a candidate point C1 in the shape model M1 applied to the detection point group B1 of the object 30A. The target point T of the object 30A specified based on observation information observed at time t2 is a candidate point C4 in the shape model M1 fitted into the detection point group B1 of the object 30A.

In this case, error occurs in calculation of the moved distance, the moving direction, and the moving speed of the object 30A for the moving amount of the object 30A, using the candidate point C4 specified as the target point T at time t2 and the candidate point C1 specified as the target point T at time t1.

Thus, the specification function 10N preferably employs a method described below when at least one of the moving distance using the specified target point T, the moving direction, and the moving speed of the object 30 (in FIG. 7, the object 30A) is derived.

Specifically, in this case, the specification function 10N may derive the moving distance, the moving direction, and the moving speed using candidate points C at positions corresponding to each other in shape models M1 applied to the object 30A at different times. The candidate points C at the corresponding positions indicate candidate points C having the same positional relation in shape models M (shape models M1, for example) applied to the same object 30 (in this example, the object 30A) at different times.

In the example illustrated in FIG. 7, the specification function 10N derives at least one of the moving distance, the moving direction, and the moving speed of the object 30A using the target point T as candidate point C1 at time t1, and candidate point C1 as the candidate point C at time t2 corresponding to candidate point C1 at time t1.

In this manner, the information processing device 10 according to the present embodiment can accurately derive at least one of the moving distance, the moving direction, and the moving speed of an object 30 in addition to the above-described effect.

When deriving at least one of the moving distance, the moving direction, and the moving speed of the object 30A, the specification function 10N may use, as the moving amount of the object 30A, the sum of the distance between the target point T (candidate point C1) at time t1 and the target point T (candidate point C4) at time t2, and the length of the object 30A in the moving direction. A positional relation between candidate point C1 and candidate point C4 in the shape model M may be used in place of the length of the object 30A in the moving direction.

The present embodiment describes the case in which the specification function 10N specifies, as the target point T, any one of a candidate point C closest to the position of the sensor 10G, a candidate point C having a highest distribution rate of detection points 32, and a candidate point C closest to detection points 32 among candidate points C set to the shape model M in advance. However, the specification function 10N may specify, as the target point T, one of candidate points C set to the shape model M in advance, and a method of this specification is not limited.

The specification function 10N may use a combination of a plurality of specification methods for the specification of the target point T. For example, the specification function 10N calculates, as one reference value, the sum of reference values of specification methods. Then, the specification function 10N may determine candidate points C set to the shape model M based on the reference value, and specify, as the target point T, a candidate point C determined to be most relevant. Alternatively, the specification function 10N may perform determination processing with a threshold set to each of specification methods and specify, as the target point T, a candidate point C for which a large part (or all) of the thresholds are satisfied.

In this manner, the specification function 10N specifies the target point T through a combination of a plurality of specification methods, and thus the information processing device 10 can more accurately specify the target point T.

For example, as illustrated in FIG. 7, during a time period including times (time t1 and time t2) between which a candidate point C specified as the target point T from the shape model M1 applied to the object 30A changes, the specification of the target point T with one specification method causes variation of a candidate point C specified as the target point T in some cases. However, when the specification function 10N specifies the target point T through a combination of a plurality of specification methods, such a variation can be avoided.

Second Embodiment

Figure 8:
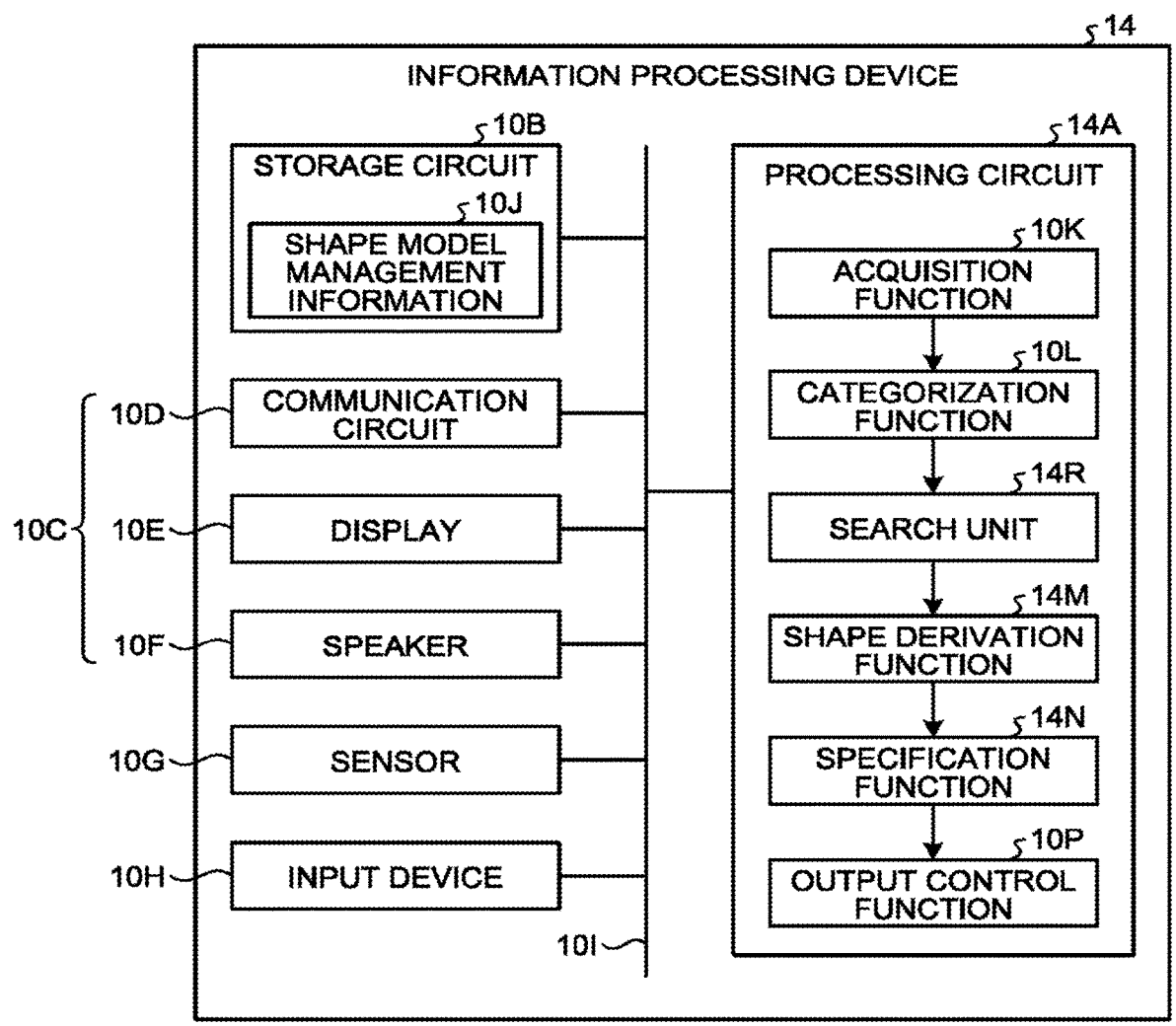
FIG. 8 is a block diagram illustrating the configuration of an information processing device.

FIG. 8 is a block diagram of an exemplary configuration of an information processing device 14. In the present embodiment, the information processing device 14 specifies the target point T by a method different from that used by the information processing device 10 according to the first embodiment.

The following describes the configuration of the information processing device 14 in detail.

The information processing device 14 specifies the target point T of the object 30. The information processing device 14 is, for example, a dedicated or generalized computer. The information processing device 14 includes a processing circuit 14A, the storage circuit 10B, the output circuit 10C (the communication circuit 10D, the display 10E, and the speaker 10F), the sensor 10G, and the input device 10H.

The information processing device 14 is same as the information processing device 10 according to the first embodiment except for including the processing circuit 14A in place of the processing circuit 10A.

The processing circuit 14A includes the acquisition function 10K, the categorization function 10L, a searcher 14R, a shape fitting function 14M, a specification function 14N, and the output control function 10P. The processing circuit 14A is same as the processing circuit 10A except for including the shape fitting function 14M and the specification function 14N in place of the shape fitting function 10M and the specification function 10N, and further including the searcher 14R.

In the present embodiment, the processing circuit 14A specifies the target point T of the object 30 at a timing (first timing) from the target point T of the same object 30 at another timing (second timing).

The first timing and the second timing are different from each other in at least one of the timing of acquisition of the observation information by the sensor 10G and the position of the sensor 10G. When the acquisition timing differs between the first and the second timings, the second timing may be earlier than the first timing or later than the first timing. When the position of the sensor 10G differs between the first and the second timings, it is treated as if the information processing device 14 includes a plurality of sensors 10G installed at different positions. Then, one of pieces of observation information acquired from the respective sensors 10G is used as observation information at the first timing, and observation information acquired from the other sensors 10G is used as observation information at the second timing.

When the second timing is later than the first timing (in other words, in the future of the first timing), the processing circuit 14A may first acquire a plurality of pieces of observation information corresponding to the respective timings, and then specify the target point T of the object 30 based on the observation information of the respective timings.

The processing circuit 14A according to the present embodiment further includes the searcher 14R. The processing circuit 14A includes the shape fitting function 14M and the specification function 14N in place of the shape fitting function 10M and the specification function 10N according to the first embodiment. The acquisition function 10K, the categorization function 10L, and the output control function 10P are same as those in the first embodiment.

Figure 9B:
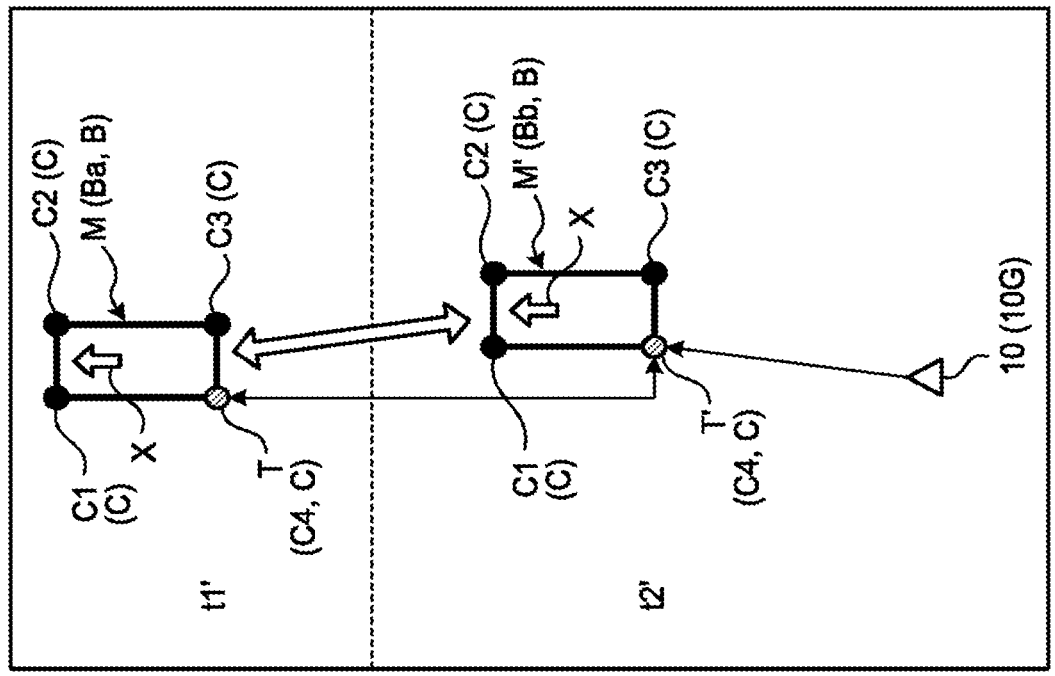
FIGS. 9A and 9B are explanatory diagrams of processing executed by a processing circuit.
Figure 9A:
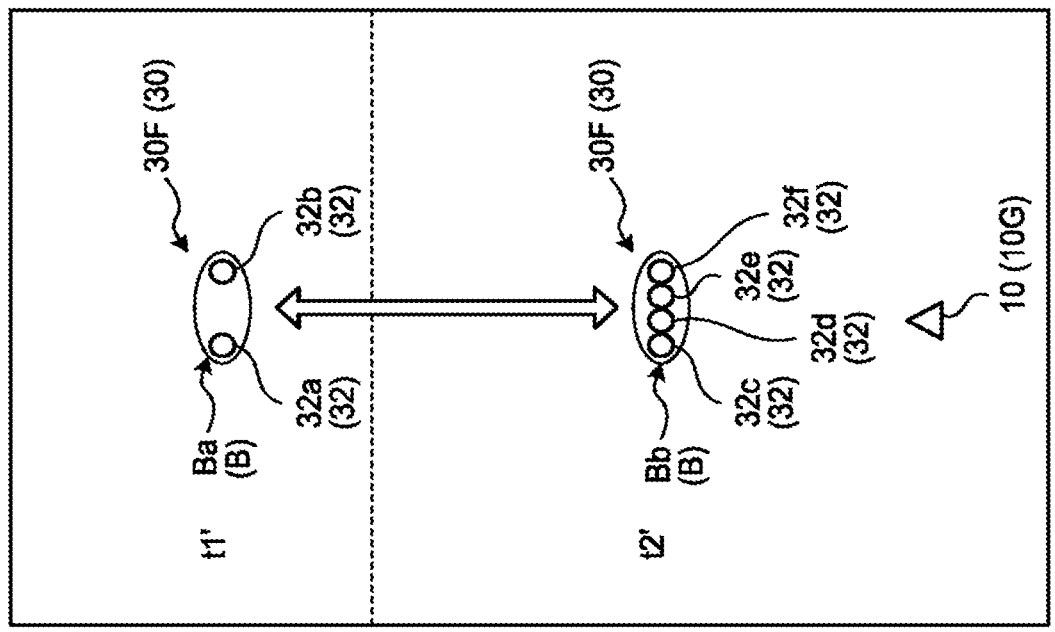

FIGS. 9A and 9B are explanatory diagrams of processing executed by the processing circuit 14A.

The searcher 14R searches for a detection point group B representing an object 30 at a second timing t2', which corresponds to a detection point group B representing the same object 30 at a first timing t1'.

For example, assume that the acquisition function 10K acquires position information of detection points $32c$ to $32f$ as position information of detection points 32 representing an object 30F at the second timing t2' as illustrated in FIG. 9A. In addition, assume that the categorization function 10L clusters these detection points 32c to 32f into a detection point group Bb representing the object 30F.

The acquisition function 10K acquires position information of detection points 32 (detection points 32a and 32b) at the first timing t1'. Then, the categorization function 10L clusters these detection points 32 (detection points 32a and 32b) into a detection point group Ba representing the object 30F.

Then, the searcher 14R performs, for each detection point group B clustered by the categorization function 10L, a search for a detection point group B representing the same object 30 at the second timing t2'.

For example, the searcher 14R stores the detection point groups B at the second timing t2'. Then, the searcher 14R receives the detection point group Ba at the first timing t1' from the categorization function 10L, and searches the detection points group B at the second timing t2' for a detection point group B (detection point group Bb) representing the object 30F identical to the object 30F represented by the detection point group Ba.

For example, the searcher 14R performs, for each detection point 32 included in the detection point group Ba at the first timing t1', a search for the corresponding detection point 32 at the second timing t2'. Then, the searcher 14R searches the detection point groups B at the second timing t2' for a detection point group B including a largest number of detection points 32 corresponding detection points 32 included in the detection point group Ba at the first timing t1', as the detection point group Bb representing the same object 30F.

Specifically, the searcher 14R searches for a detection point 32 existing at a closest position at the second timing t2' as a corresponding detection point 32 by using position information of the detection points 32 included in the detection point group Ba at the first timing t1'. Then, a detection point group B including a largest number of corresponding detection points 32 at the second timing t2' is searched as the detection point group Bb representing the same object 30F at the second timing t2'.

The searcher 14R may search for a detection point 32 at the second timing t2' corresponding to each detection point 32 included in the detection point group Ba at the first timing t1' by another method.

For example, the searcher 14R calculates, for each detection point 32 included in the detection point group Ba at the first timing t1', a feature amount indicating distribution of other surrounding detection points 32. Then, the searcher 14R may search for a detection point 32 having a closest feature amount at the second timing t2' as a corresponding detection point 32.

The searcher 14R may search for the detection point group Bb representing the same object 30F at the second timing t2', which corresponds to the detection point group Ba at the first timing t1' based on a difference (for example, an elapsed time) between the first timing t1' and the second timing t2' and the moving direction and the moving amount of the object 30F at the second timing t2'.

In this manner, the searcher 14R searches detection points 32 at the second timing t2' for the detection point group Bb representing the object 30F identical to the object 30F represented by the detection point group Ba at the first timing t1'.

The searcher 14R may perform association for each detection point group B representing the same object 30 by using a detection point group B clustered at the first timing t1' and a detection point group B clustered at the second timing t2'. In this case, the searcher 14R may search for a corresponding detection point group B by using the moving distance of each detection point 32 belonging to a detection point group B, and the feature of each detection point 32 belonging to the detection point group B.

The shape fitting function 14M is an exemplary shape fitter. The shape fitting function 14M applies the shape model M to each of the detection point group Ba at the first timing t1' and the corresponding detection point group Bb at the second timing t2'. Similarly to the shape fitting function 10M according to the first embodiment, the shape fitting function 14M may fit the shape model M into the detection point group B.

In an example illustrated in FIGS. 9A and 9B, the shape fitting function 14M fits a shape model M into the detection point group Ba representing the object 30F at the first timing t1'. The shape fitting function 14M also fits a shape model M' into the detection point group Bb representing the same object 30F at the second timing t2' (refer to FIG. 9B).

Then, the specification function 14N specifies the target point T of the object 30F at the first timing t1' based on a target point T' set based on the shape model M fitted into the detection point group Ba at the first timing t1' and the shape model M' applied to the detection point group Bb at the second timing t2' (refer to FIG. 9B).

Specifically, first, the specification function 14N fits the shape model M' to the detection point group Bb at the second timing t2', and specifies one of candidate points C of the shape model M' as the target point T'. The fitting of the shape model M' and the specification of the target point T' are performed by methods same as those in the first embodiment.

When the target point T' is already specified for the shape model M' fitted into the detection point group Bb at the second timing t2', the specification function 14N may specify the target point T' by reading the specified target point T'.

Then, the specification function 14N specifies the target point T of the detection point group Ba from among candidate points C (C1 to C4) set to the shape model M fitted into the detection point group Ba at the first timing t1', based on the target point T' of the shape model M' at the second timing t2'.

In the example illustrated in FIG. 9B, the specification function 14N associates candidate points C of the shape model M and the shape model M', assuming that the object 30F is moving in a direction (the direction of arrow X) away from the sensor 10G. Accordingly, in the example illustrated in FIG. 9B, the specification function 14N specifies, as the target point T of the detection point group Ba, the candidate point C4 at a position corresponding to the target point T' (the candidate point C4) of the shape model M' at the second timing t2' among the candidate points C (C1 to C4) set to the shape model M at the first timing t1'.

In this manner, in the present embodiment, the specification function 14N specifies the target point T of the same object 30 at the first timing t1' by using the target point T' specified at another timing (the second timing t2').

Thus, the information processing device 14 according to the present embodiment can reliably specify the target point T of the object 30, for example, when a small number of detection points 32 are included in a detection point group B representing an object 30 at the first timing t1', or when each of candidate points C of an applied shape model M exists at a position distant from the sensor 10G.

Observation information used as the second timing t2' preferably has a larger number of detection points 32 belonging to a detection point group B than the number of detection points 32 belonging to the detection point group B, which is derived from observation information of another timing. Observation information used as the second timing t2' preferably has a closer distance from the sensor 10G to the object 30 than observation information of another timing.

Accordingly, the specification function 14N can more accurately specify the target point T of the object 30.

In the above description, the searcher 14R stores detection point groups B at the second timing t2' and searches the detection point groups B at the second timing t2' for a detection point group B (the detection point group Bb) representing the object 30F identical to the object 30F represented by the detection point group Ba at the first timing t1'.

However, the processing circuit 14A may search shape models M fitted into detection point groups B at the second timing t2' for a shape model M' of the same object 30F at the second timing t2', which corresponds to a shape model M fitted into the detection point group Ba at the first timing t1', and may use the shape model M' for the specification of the target point T.

The present embodiment describes the case in which the target point T is specified by using the two timings of the first timing t1' and the second timing t2'. However, the processing circuit 14A may specify the target point T by using a plurality of the second timings t2' for the first timing t1'.

The processing circuit 14A may predict movement of the object 30F at the first timing t1' from the moving direction and the moving speed of the same object 30F at the second timing t2'. Then, the processing circuit 14A may specify the target point T by using a shape model M at a predicted position and a shape model M fitted into the detection point group Ba at the first timing t1'.

The following describes an exemplary procedure of processing executed by the processing circuit 14A. FIG. 10 is a flowchart of an exemplary procedure of the processing executed by the processing circuit 14A. In the process illustrated in FIG. 10, the second timing t2' is earlier than (in the past of) the first timing t1'.

First, the acquisition function 10K acquires observation information at a first timing t1' from the sensor 10G (step S200). This first timing t1' may be updated with the timing of each acquisition of the observation information by the sensor 10G.

Subsequently, the acquisition function 10K acquires position information of each detection point 32 from the observation information at the first timing t1' acquired at step S200 (step S202).

Subsequently, the categorization function 10L clusters detection points 32, the position information of which is acquired at step S202, into a detection point group B representing an object 30 (step S204). The following description assumes that, at step S204, the categorization function 10L clusters detection points 32 (detection points 32a and 32b) into a detection point group Ba representing an object 30F.

Subsequently, the searcher 14R searches for a corresponding detection point group Bb representing the object 30F at the second timing t2' (step S206). Subsequently, the shape fitting function 14M fits a shape model M into a detection point group Ba representing the object 30F at the first timing t1' (step S208). The shape fitting function 14M also fits a shape model M' into the detection point group Bb representing the same object 30F at the second timing t2' (step S208).

Subsequently, the specification function 14N specifies, as a target point T', one of candidate points C of the shape model M' applied to the detection point group Bb at the second timing t2' (step S210).

Subsequently, the specification function 14N specifies, as the target point T of the object 30F at the first timing t1', a candidate point C at a position corresponding to the target point T' specified at step S210 among candidate points C (C1 to C4) set to the shape model M fitted into the detection point group Ba at the first timing t1' (step S212).

Subsequently, the specification function 14N outputs output information indicating the target point T specified at step S212 (step S214).

Subsequently, the processing circuit 14A determines whether to end the processing (step S216). For example, the processing circuit 14A performs the determination at step S216 by determining whether a signal indicating end of the processing has been received from the input device 10H. If the determination at step S216 is negative (No at step S216), the present routine returns to the above-described step S200. If the determination at step S216 is positive (Yes at step S216), the present routine is ended.

As described above, in the information processing device 14 according to the present embodiment, the searcher 14R searches for the detection point group B that corresponds to the detection point group B representing the object 30 and clustered based on the position information of each detection point 32 at the first timing t1', represents the same object 30, and is clustered based on the position information of each detection point 32 at the second timing t2'. The specification function 14N specifies, as the target point T of the object 30 at the first timing t1', a position in the shape model M fitted into the detection point group B at the first timing t1', corresponding to the target point T' set based on the shape model M fitted into the detection point group B at the second timing t2'.

In this manner, the information processing device 14 according to the present embodiment specifies the target point T of the object 30 included in the observation information at a timing to be processed by using the target point T' specified based on the observation information at a different timing.

Thus, the information processing device 14 according to the present embodiment can reliably and accurately specify the target point T in addition to the effect of the first embodiment. The information processing device 14 according to the present embodiment can achieve at least one of reduction of a processing load on the processing circuit 14A and improvement of a processing speed in addition to the effect of the first embodiment.

Third Embodiment

Figure 11:
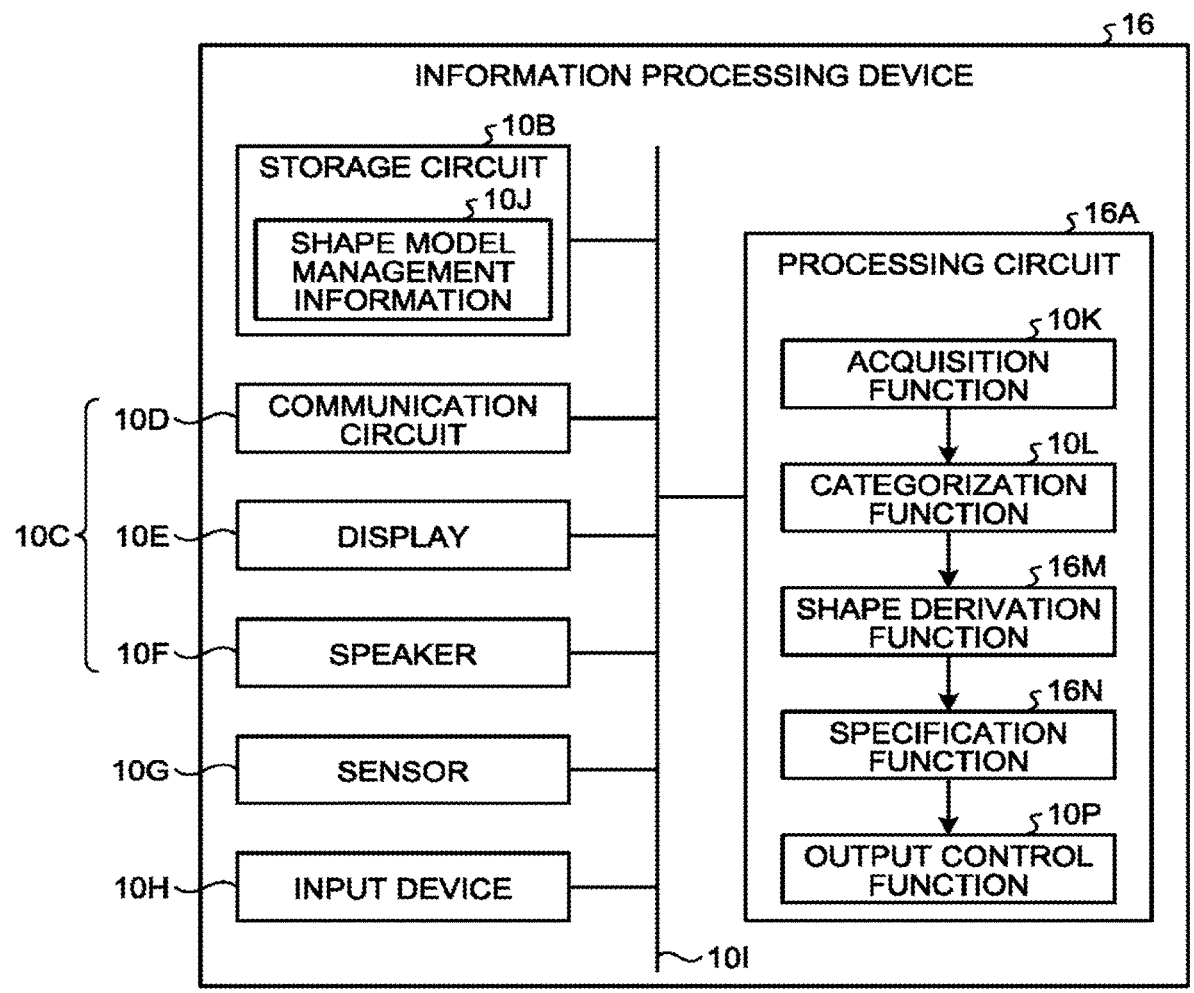
FIG. 11 is a block diagram illustrating the configuration of an information processing device.

FIG. 11 is a block diagram of an exemplary configuration of an information processing device 16 according to the present embodiment. The information processing device 16 according to the present embodiment fits a plurality of the shape models M to the detection point group B and specifies the target point T of the object 30 based on the shape models M.

Similarly to the information processing devices 10 and 14 according to the above-described embodiments, the information processing device 16 specifies the target point T of the object 30. The information processing device 16 is, for example, a dedicated or generalized computer.

The information processing device 16 includes a processing circuit 16A, the storage circuit 10B, the output circuit 10C, the sensor 10G, and the input device 10H. The information processing device 16 is same as the information processing device 10 according to the first embodiment except for including the processing circuit 16A in place of the processing circuit 10A.

The processing circuit 16A includes the acquisition function 10K, the categorization function 10L, a shape fitting function 16M, a specification function 16N, and the output control function 10P. The processing circuit 16A is same as the processing circuit 10A except for including the shape fitting function 16M and the specification function 16N in place of the shape fitting function 10M and the specification function 10N.

The shape fitting function 16M fits a plurality of the shape models M different from each other in at least one of shape and position to the detection point group B clustered by the categorization function 10L. In other words, in the present embodiment, the shape fitting function 16M fits a plurality of the shape models M to the one detection point group B.

Similarly to the shape fitting function 10M according to the first embodiment, the shape fitting function 16M fits each shape model M. In the first embodiment, for each detection point group B representing one object 30, the shape fitting function 10M slightly changes variables of an initial shape model and fits one initial shape model that minimizes the evaluating function as the shape model M to the detection point group B projected onto the horizontal plane. In the present embodiment, however, for each detection point group B representing one object 30, the shape fitting function 10M applies, as a plurality of the shape models M, a plurality of initial shape models predetermined in ascending order of the evaluating function.

Figure 12:
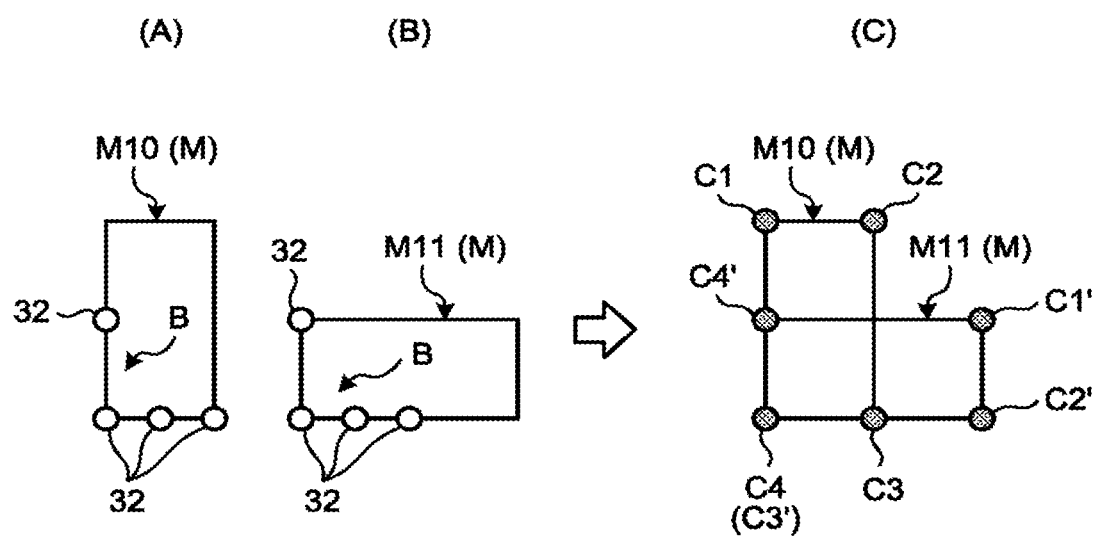
FIG. 12 illustrates explanatory diagrams of specification of a target point.

FIG. 12 illustrates explanatory diagrams of specification of the target point T by the processing circuit 16A. In FIG. 12, (A) to (C) illustrate a case in which two shape models M (a shape model M10 (refer to (A) in FIG. 12) and a shape model M11 (refer to (B) in FIG. 12)) having shapes different from each other are fitted into the detection point group B consisting of detection points 32. The phenomenon illustrated in (A) to (C) of FIG. 12 occurs due to change of an observed surface on the object 30 in some cases.

The specification function 16N specifies the target point T of the object 30 represented by the detection point group B based on the shape models M fitted into the detection point group B.

FIG. 12C illustrates a state in which the shape models M (shape models M10 and M11) illustrated in (A) and (B) of FIG. 12 are placed over such that the positions of the detection points 32 match with each other.

The specification function 16N specifies, as the target point T, one of candidate points C set to each of the applied shape models M (candidate points C1' to C4' of the shape model M11, and candidate points C1 to C4 of the shape model M10). The method employed by the specification function 10N in the first embodiment may be employed as a method of specifying one candidate point C as the target point T from among the candidate points C.

For example, the specification function 16N may specify, as the target point T, the candidate point C closest to the position of the sensor 10G (for example, the candidate point C4) among the candidate points C (candidate points C1' to C4' of the shape model M11 and candidate points C1 to C4 of the shape model M10) set to each of the shape models M.

The specification function 16N may specify the target point T by using each average position of candidate points C existing in the same region for the shape models M fitted into the detection point group B. The same region is a region at the same position between the shape models M.

Figure 13:
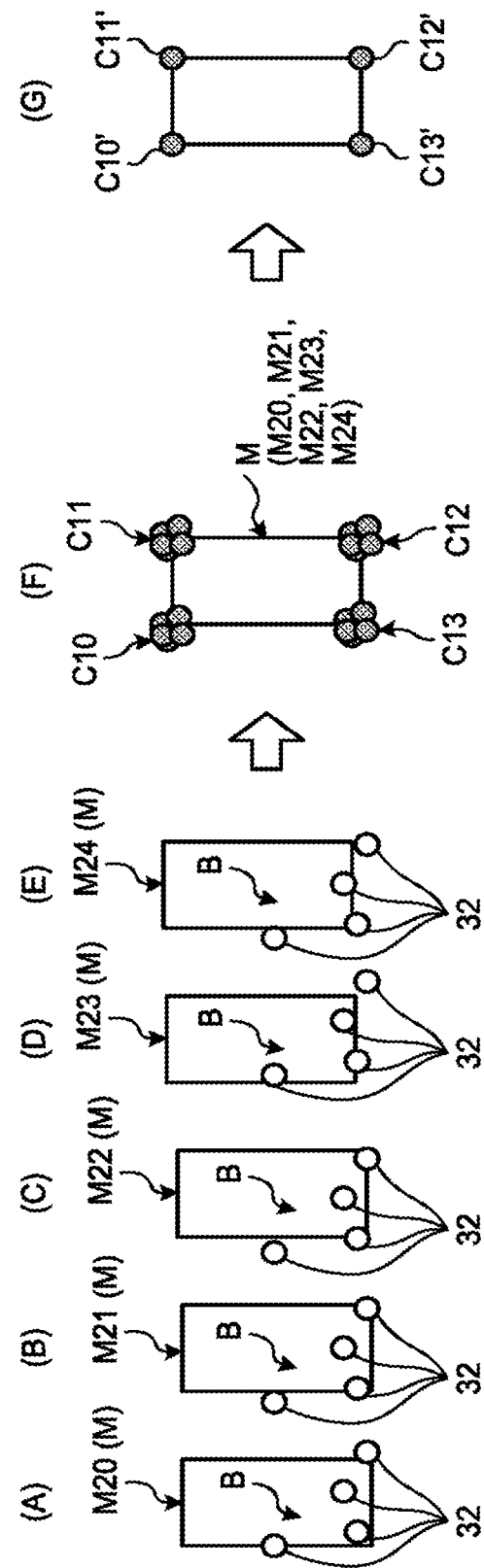
FIG. 13 illustrates explanatory diagrams of specification of a target point.

FIG. 13 illustrates explanatory diagrams of specification of the target point T by the processing circuit 16A. In FIG. 13, (A) to (G) illustrate a case in which five shape models M (shape models M20 to M24 (refer to (A) to (E) in FIG. 13)) at positions different from each other are fitted into the detection point group B consisting of detection points 32. The phenomenon illustrated in FIG. 13 occurs when a plurality of the shape models M for which the value of the evaluating function is small (the value of the evaluating function is smaller than a predetermined value) exist near the shape of an actual object.

In FIG. 13, (F) illustrates a state in which detection points 32 of each of the shape models M (shape models M20 to M24) illustrated in (A) to (E) of FIG. 13 are fitted into a rectangle representing the actual shape of the object 30.

The specification function 16N calculates an average position of candidate points C set to the shape models M (shape models M20 to M24) for each of groups (groups C10 to C13) of candidate points C in the same region between the shape models M. Then, the calculated average positions are used as candidate points C (C10', C11', C12', and C13') corresponding to the detection point group B.

Then, the specification function 16N specifies one of these candidate points C (C10', C11', C12', and C13') as the target point T. The method employed by the specification function 10N in the first embodiment may be employed as a method of specifying one candidate point C as the target point T from among the candidate points C (C10', C11', C12', and C13'). The specification function 16N may use a middle point or weighted average of candidate points C in place of the average position of candidate points C.

Figure 14:
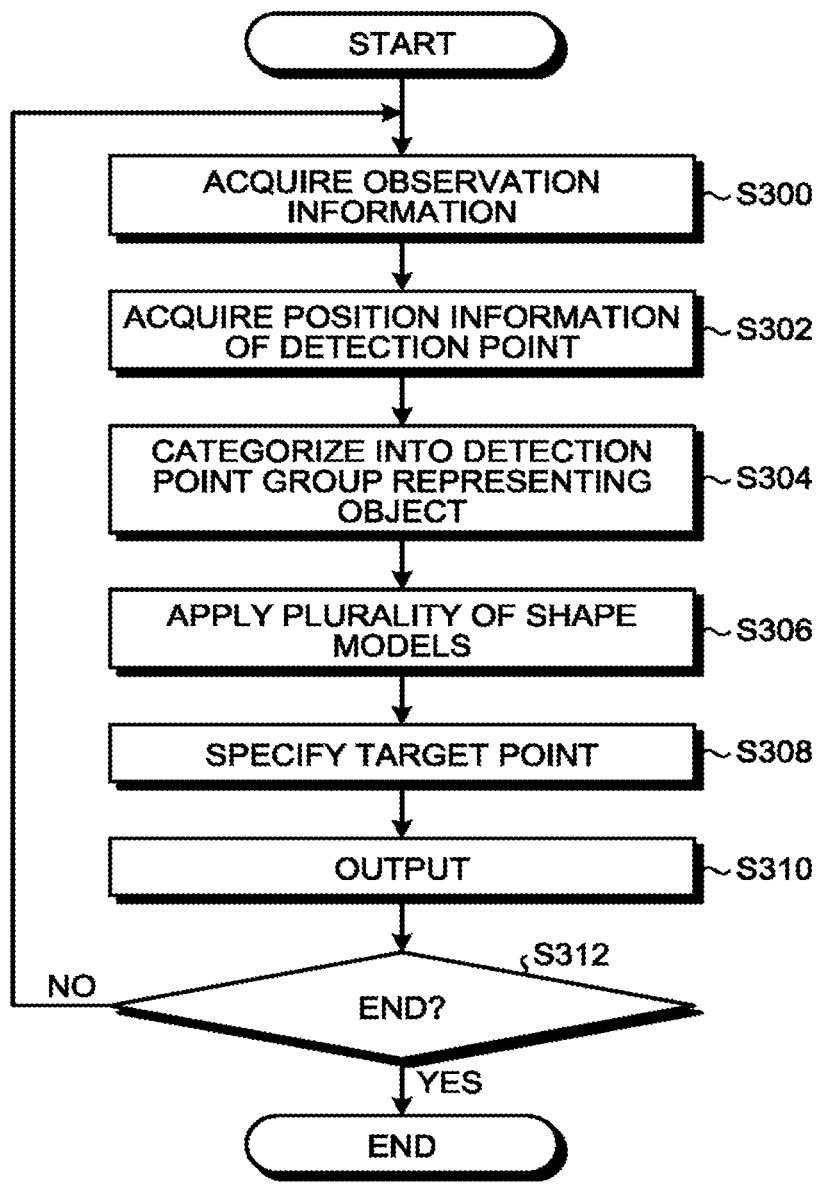
FIG. 14 is a flowchart of processing executed by a processing circuit.

The following describes a procedure of the processing executed by the processing circuit 16A. FIG. 14 is a flowchart of an exemplary procedure of the processing executed by the processing circuit 16A.

First, the acquisition function 10K acquires the observation information from the sensor 10G (step S300). Subsequently, the acquisition function 10K acquires the position information of each detection point 32 from the observation information acquired at step S300 (step S302).

Subsequently, the categorization function 10L clusters detection points 32, the position information of which is acquired at step S302, into the detection point group B representing the object 30 (step S304). Subsequently, the shape fitting function 16M fits a plurality of the shape models M into the detection point group B clustered at step S304 (step S306).

Subsequently, the specification function 16N specifies the target point T based on the shape models M applied at step S306 (step S308). Subsequently, the specification function 16N outputs the output information indicating the target point T specified at step S308 (step S310).

Subsequently, the processing circuit 16A determines whether to end the processing (step S312). For example, the processing circuit 16A performs the determination at step S312 by determining whether a signal indicating end of the processing has been received from the input device 10H. If the determination at step S312 is negative (No at step S312), the present routine returns to the above-described step S300. If the determination at step S312 is positive (Yes at step S312), the present routine is ended.

As described above, in the information processing device 16 according to the present embodiment, the shape fitting function 16M fits, into the detection point group B, a plurality of the shape models M different from each other in at least one of shape and position. The specification function 16N specifies the target point T of the object 30 based on the shape models M.

Accordingly, the information processing device 16 according to the present embodiment can reliably specify the target point T of the object 30 when the application of the shape model M is unreliable.

Accordingly, the information processing device 16 according to the present embodiment can more accurately specify the target point T of the object 30 in addition to the effect of the information processing device 10 according to the first embodiment described above.

Figure 15:
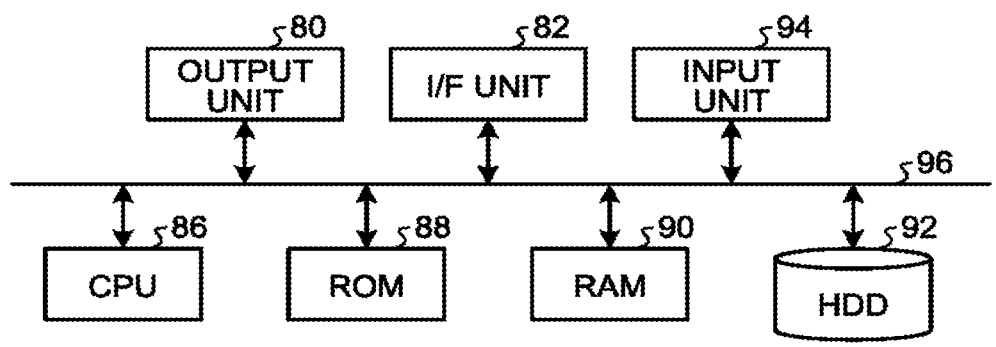
FIG. 15 is a hardware configuration diagram.

The following describes an exemplary hardware configuration of the information processing devices 10, 14, and 16 according to the above-described embodiments. FIG. 15 is an exemplary hardware configuration diagram of the information processing devices 10, 14, and 16 according to the above-described embodiments.

The information processing devices 10, 14, and 16 according to the above-described embodiments each include a control device such as a central processing unit (CPU) 86, a storage device such as a read only memory (ROM) 88, a random access memory (RAM) 90, or a hard disk drive (HDD) 92, an I/F unit 82 as an interface to various instruments, an output unit 80 configured to output various kinds of information such as the output information, an input unit 94 configured to receive an operation by the user, and a bus 96 connecting these components, and each have a hardware configuration using a normal computer.

In the information processing devices 10, 14, and 16 according to the above-described embodiments, each above-described function is achieved on the computer by the CPU 86 loading a computer program from the ROM 88 onto the RAM 90 and executing the computer program.

A computer program for executing the above-described processing executed by the information processing devices 10, 14, and 16 according to the above-described embodiments is stored in the HDD 92. Alternatively, the computer program for executing the above-described processing executed by the information processing devices 10, 14, and 16 according to the above-described embodiments may be incorporated in the ROM 88 in advance and provided.

The computer program for executing the above-described processing executed by the information processing devices 10, 14, and 16 according to the above-described embodiments may be stored as a file in an installable format or an executable format in a computer-readable storage medium such as a CD-ROM, a CD-R, a memory card, a digital versatile disc (DVD), or a flexible disk (FD) and provided as a computer program product. Alternatively, the computer program for executing the above-described processing executed by the information processing devices 10, 14, and 16 according to the above-described embodiments may be stored on a computer connected to a network such as the Internet and may be provided by downloading through the network. Alternatively, the computer program for executing the above-described processing executed by the information processing devices 10, 14, and 16 according to the above-described embodiments may be provided or distributed through a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a memory; and
processing circuitry configured to operate as:
an acquirer configured to acquire position information of detection points;
a categorizer configured to cluster the detection points into one or more detection point groups each representing an object;
a shape fitter configured to fit a predetermined shape model into each detection point group on the basis of the position information of the clustered detection points belonging to the each detection point group; and
a specifier configured to specify a target point that is a single point representing the object on the basis of the shape model, wherein
the processing circuitry is further configured to operate as a searcher configured to search for detection point groups clustered on the basis of the position information at different timings of at least a first timing and a second timing, a detection point group at the first timing and a detection point group at the second timing representing an identical object, and
the specifier specifies, as the target point of the object at the first timing, a position in the shape model fitted into the detection point group at the first timing, the position corresponding to the target point set on the basis of the shape model fitted into the detection point group at the second timing.

2. The device according to claim 1, wherein the acquirer acquires the position information of the detection points from observation information on surrounding of a sensor.

3. The device according to claim 1, wherein the specifier specifies, as the target point, one of candidate points set to the shape model in advance.

4. The device according to claim 2, wherein the specifier specifies, as the target point, a candidate point closest to the sensor among the candidate points set to the shape model in advance.

5. The device according to claim 1, wherein the specifier specifies, as the target point, a candidate point having a highest distribution rate of the detection points among candidate points set to the shape model in advance.

6. The device according to claim 1, wherein the specifier specifies, as the target point, a candidate point closest to any one of the detection points among candidate points set to the shape model in advance.

7. The device according to claim 1, wherein
the shape fitter fits, into the detection point group, shape models that are different from each other in at least one of a shape and a position, and
the specifier specifies the target point of the object on the basis of the shape models.

8. The device according to claim 2, wherein the sensor includes at least one of a distance sensor and an image capturing device.

9. The device according to claim 1 mounted on a moving object or a stationary object.

10. The device according to claim 1, wherein the processing circuitry is further configured to operate as an output unit configured to output output information including information indicating the specified target point.

11. An information processing method comprising:
acquiring position information of detection points;
clustering the detection points into one or more detection point groups each representing an object;
fitting a predetermined shape model into each detection point group on the basis of the position information of the clustered detection points belonging to the each detection point group; and
specifying a target point that is a single point representing the object on the basis of the shape model, wherein
detection point groups clustered on the basis of the position information at different timings of at least a first timing and a second timing are searched, and a detection point group at the first timing and a detection point group at the second timing represent an identical object, and
as the target point of the object at the first timing, a position in the shape model fitted into the detection point group at the first timing is specified, the position corresponding to the target point set on the basis of the shape model fitted into the detection point group at the second timing.

12. The method according to claim 11, wherein the position information of the detection points is acquired from observation information on surrounding of a sensor.

13. The method according to claim 11, wherein one of candidate points set to the shape model in advance is specified as the target point.

14. The method according to claim 12, wherein a candidate point closest to the sensor is specified as the target point among candidate points set to the shape model in advance.

15. The method according to claim 11, wherein a candidate point having a highest distribution rate of the detection points is specified as the target point among candidate points set to the shape model in advance.

16. The method according to claim 11, wherein a candidate point closest to any one of the detection points is specified as the target point among candidate points set to the shape model in advance.

17. The method according to claim 11, wherein
shape models that are different from each other in at least one of a shape and a position are fit into the detection point group, and
the target point of the object is specified on the basis of the shape models.

18. The method according to claim 12, wherein the sensor includes at least one of a distance sensor and an image capturing device.

* * * * *